(12) United States Patent
Nakase et al.

(10) Patent No.: US 7,689,787 B2
(45) Date of Patent: Mar. 30, 2010

(54) DEVICE AND METHOD FOR CONTROLLING NUMBER OF LOGICAL PATHS

(75) Inventors: Kenta Nakase, Yokohama (JP); Shinya Takeuchi, Fujisawa (JP); Yasufumi Uchiyama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 696 days.

(21) Appl. No.: 11/562,076

(22) Filed: Nov. 21, 2006

(65) Prior Publication Data

US 2008/0077737 A1 Mar. 27, 2008

(30) Foreign Application Priority Data

Sep. 27, 2006 (JP) ............................. 2006-262267

(51) Int. Cl.
*G06F 12/00* (2006.01)
(52) U.S. Cl. ................... 711/154; 711/148; 711/162
(58) Field of Classification Search ................ 711/154, 711/162, 148
See application file for complete search history.

(56) References Cited

U.S. PATENT DOCUMENTS

| 5,495,426 A * | 2/1996 | Waclawsky et al. ......... 709/226 |
| 2003/0233382 A1 * | 12/2003 | Gemba et al. ............... 707/201 |
| 2005/0120259 A1 | 6/2005 | Aoki et al. |
| 2006/0026346 A1 | 2/2006 | Kadoiri et al. |
| 2006/0047930 A1 | 3/2006 | Takahashi et al. |
| 2006/0069862 A1 * | 3/2006 | Kano ......................... 711/114 |

* cited by examiner

*Primary Examiner*—Shane M Thomas
(74) *Attorney, Agent, or Firm*—Brundidge & Stanger, P.C.

(57) ABSTRACT

In a control device of a computer system in which a plurality of host computers are capable of sharing a same host interface of a storage system are provided: a VOL status monitoring portion that monitors a VOL status of each VOL mapped to the VVOL and determines whether or not the VOL status is changed, and a path number control portion that updates the number of paths connecting to a VVOL in which the VOL status has changed.

9 Claims, 24 Drawing Sheets

FIG. 3

LOGICAL DEVICE MANAGEMENT TABLE   3001

| LD ID | STORAGE SUBSYSTEM ID | PHYSICAL ID | ASSIGNMENT STATUS | CAPACITY | RAID LEVEL | STORAGE SUBSYSTEM TYPE | STORAGE DEVICE TYPE |
|---|---|---|---|---|---|---|---|
| LD 11 | 01 | 01 | ASSIGNED | 100G | RAID0+1 | Stype 1 | FC |
| LD 12 | 01 | 02 | ASSIGNED | 80G | RAID0+1 | Stype 1 | FC |
| LD 13 | 01 | 03 | ASSIGNED | 20G | RAID0+1 | Stype 1 | FC |
| LD 14 | 01 | 04 | UNASSIGNED | 100G | RAID0+1 | Stype 1 | FC |
| LD 15 | 01 | 05 | UNASSIGNED | 100G | RAID0+1 | Stype 1 | FC |
| LD 21 | 02 | 01 | ASSIGNED | 80G | RAID5 | Stype 2 | FC |
| LD 22 | 02 | 02 | UNASSIGNED | 100G | RAID5 | Stype 2 | FC |
| LD 23 | 02 | 03 | UNASSIGNED | 80G | RAID5 | Stype 2 | FC |
| LD 24 | 02 | 04 | UNASSIGNED | 80G | RAID5 | Stype 2 | FC |
| LD 25 | 02 | 05 | UNASSIGNED | 80G | RAID5 | Stype 2 | FC |
| LD 31 | 03 | 01 | UNASSIGNED | 80G | RAID1 | Stype 3 | SATA |
| LD 32 | 03 | 02 | ASSIGNED | 120G | RAID1 | Stype 3 | SATA |
| LD 32 | 03 | 03 | UNASSIGNED | 100G | RAID1 | Stype 3 | SATA |
| LD 34 | 03 | 04 | UNASSIGNED | 100G | RAID1 | Stype 3 | SATA |
| LD 34 | 03 | 05 | UNASSIGNED | 80G | RAID1 | Stype 3 | SATA |

FIG. 4

LOGICAL UNIT MANAGEMENT TABLE    3003

| HOST ID | LU ID | LD ID |
|---|---|---|
| 01 | LU1 | LD11 |
| 01 | LU2 | LD21 |
| 01 | LU3 | LD12 |
| 01 | LU4 | LD13 |
| 02 | LU5 | LD32 |

FIG. 5

LEVEL DEFINITION TABLE    3005

| LEVEL NAME | ATTRIBUTE | | | | PATH LIMIT | MIGRATION TIME |
| --- | --- | --- | --- | --- | --- | --- |
| | RAID LEVEL | STORAGE SUBSYSTEM TYPE | STORAGE DEVICE TYPE | RESPONSE SPEED | | |
| HIGH LEVEL | RAID0+1 | SType 1 | FC | 10ms | 2 | EXECUTE IMMEDIATELY |
| MID LEVEL | RAID0+1 | SType 1 | FC | 20ms | 4 | EXECUTE AT TIME OF LOW LOAD |
| LOW LEVEL | RAID0+1 | SType 1 | SATA | 40ms | 4 | EXECUTE AT TIME OF LOW LOAD |

FIG. 6

VOL GROUP MANAGEMENT TABLE    3007

| GROUP NAME | VOLUME |
|---|---|
| GROUP A | LU1,LU2 |
| GROUP B | LD12,LD13 |

FIG. 7

VOLUME-PATH TABLE      3009

| PATH ID | HOST ID | HBA ID | CHA ID | LU ID | PATH STATUS |
|---|---|---|---|---|---|
| 0001 | HOST 1 | HBA 1 | CHA 1 | LU 1 | Online |
| 0002 | HOST 1 | HBA 1 | CHA 2 | LU 1 | Online |
| 0003 | HOST 1 | HBA 1 | CHA 3 | LU 1 | Offline |
| ... | ... | ... | ... | ... | ... |
| 0007 | HOST 1 | HBA 1 | CHA 7 | LU 1 | Offline |
| 0008 | HOST 1 | HBA 2 | CHA 1 | LU 1 | Online |
| ... | ... | ... | ... | ... | ... |
| 0014 | HOST 1 | HBA 2 | CHA 7 | LU 1 | Offline |
| 0015 | HOST 1 | HBA 1 | CHA 1 | LU 2 | Online |
| ... | ... | ... | ... | ... | ... |
| 0028 | HOST 1 | HBA 2 | CHA 7 | LU 2 | Offline |
| 0029 | HOST 2 | HBA 3 | CHA 1 | LU 3 | Offline |
| 0030 | HOST 2 | HBA 3 | CHA 2 | LU 3 | Offline |
| 0031 | HOST 2 | HBA 3 | CHA 3 | LU 3 | Online |
| 0032 | HOST 2 | HBA 3 | CHA 4 | LU 3 | Online |
|  |  |  |  |  |  |
| ... | ... | ... | ... | ... | ... |
| 0042 | HOST 2 | HBA 4 | CHA 7 | LU 3 | Offline |
| ... | ... | ... | ... | ... | ... |

| TYPE OF VOL ATTRIBUTE: RAID LEVEL | |
|---|---|
| VOL ATTRIBUTE VALUE | ATTRIBUTE EVALUATION VALUE |
| RAID 0+1 | 3 |
| RAID 1 | 2 |
| RAID 5 | 1 |

| TYPE OF VOL ATTRIBUTE: FOR EACH TYPE OF STORAGE SUBSYSTEM | |
|---|---|
| VOL ATTRIBUTE VALUE | ATTRIBUTE EVALUATION VALUE |
| SType1 | 3 |
| SType2 | 2 |
| SType3 | 1 |

| TYPE OF VOL ATTRIBUTE: FOR EACH STORAGE DEVICE | |
|---|---|
| VALUE | EVALUATION VALUE |
| FC | 2 |
| SATA | 1 |

FIG. 9

VOLUME TABLE 3013

| HOST ID | LU ID | NUMBER OF PATHS | NUMBER OF ONLINE PATHS | CALCULATED NUMBER OF PATHS | TYPE OF LEVEL |
|---|---|---|---|---|---|
| HOST 1 | LU 1 | 8 | 4 | 4 | HIGH LEVEL |
| HOST 1 | LU 2 | 8 | 4 | 4 | HIGH LEVEL |
| HOST 2 | LU 3 | 4 | 4 | 3.75 | MID LEVEL |

FIG. 10

VOLUME EVALUATION VALUE TABLE 3015

| HOST ID | LU ID | VOL EVALUATION VALUE | EVALUATION VALUE MAXIMUM VALUE |
|---|---|---|---|
| HOST 1 | LU 1 | 8 | 8 |
| HOST 1 | LU 2 | 8 | 8 |
| HOST 2 | LU 3 | 3 | 4 |

FIG. 11

NUMBER OF PATHS FOR UPDATING TABLE 3017

| HOST | LU ID | NUMBER OF PATHS TO BE UPDATED | ID OF TARGET CHA |
|---|---|---|---|
| HOST 1 | LU 1 | +2 | CHA1 |
| HOST 2 | LU 3 | −1 | CHA3 |

FIG. 12

PATH STATUS UPDATE CANDIDATE TABLE  3019

| HOST ID | HBA ID | LU ID | CHA ID | PASS ID | TYPE OF OPERATION |
|---------|--------|-------|--------|---------|-------------------|
| HOST 1  | HBA 1  | LU 1  | CHA1   | 0001    | Online            |
| HOST 1  | HBA 1  | LU 1  | CHA2   | 0002    | Offline           |

FIG. 13

PATH NUMBER AUTOMATIC UPDATE OFF TABLE  3021

| HOST ID | LU ID |
|---------|-------|
| HOST 2  | LU 2  |

FIG. 14

CHA EVALUATION VALUE TABLE  3023

| CHA ID | CHA EVALUATION VALUE |
|--------|----------------------|
| CHA1   | 10                   |
| CHA2   | 5                    |
| CHA3   | 7                    |

FIG. 15

NUMBER OF PATHS LIMIT TABLE  3025

| MINIMUM NUMBER OF PATHS | 2 |
|-------------------------|---|

FIG. 16

PATH MANAGEMENT TABLE (PATH MANAGEMENT TABLE OF HOST 1)   57

| PATH ID | HBA ID | CHA ID | LU ID | PATH STATUS |
|---|---|---|---|---|
| 0001 | HBA 1 | CHA 1 | LU 1 | Online |
| 0002 | HBA 1 | CHA 2 | LU 1 | Online |
| 0003 | HBA 1 | CHA 3 | LU 1 | Offline |
| 0004 | HBA 1 | CHA 4 | LU 1 | Offline |
| 0005 | HBA 1 | CHA 5 | LU 1 | Offline |
| 0006··· | HBA 1 | CHA 6 | LU 1 | Offline |
| 0007 | HBA 1 | CHA 7 | LU 1 | Offline |
| 0008 | HBA 2 | CHA 1 | LU 1 | Online |
| 0009 | HBA 2 | CHA 2 | LU 1 | Online |
| 0010 | HBA 2 | CHA 3 | LU 1 | Offline |
| 0011 | HBA 2 | CHA 4 | LU 1 | Offline |
| 0012 | HBA 2 | CHA 5 | LU 1 | Offline |
| 0013 | HBA 2 | CHA 6 | LU 1 | Offline |
| 0014 | HBA 2 | CHA 7 | LU 1 | Offline |
| 0015 | HBA 1 | CHA 1 | LU 2 | Online |
| 0016 | HBA 1 | CHA 2 | LU 2 | Online |
| 0007 | HBA 1 | CHA 3 | LU 2 | Offline |
| 0018 | HBA 1 | CHA 4 | LU 2 | Offline |
| 0019 | HBA 1 | CHA 5 | LU 2 | Offline |
| 0020 | HBA 1 | CHA 6 | LU 2 | Offline |
| 0021 | HBA 1 | CHA 7 | LU 2 | Offline |
| 0022 | HBA 2 | CHA 1 | LU 2 | Online |
| 0023 | HBA 2 | CHA 2 | LU 2 | Online |
| 0024 | HBA 2 | CHA 3 | LU 2 | Offline |
| 0025 | HBA 2 | CHA 4 | LU 2 | Offline |
| 0026 | HBA 2 | CHA 5 | LU 2 | Offline |
| 0027 | HBA 2 | CHA 6 | LU 2 | Offline |
| 0028 | HBA 2 | CHA 7 | LU 2 | Offline |

FIG. 17

VOLUME ASSOCIATION TABLE  3029

| LU ID | LD ID | STORAGE SUBSYSTEM ID |
|---|---|---|
| LU1 | LD11 | 01 |
| LU2 | LD21 | 02 |
| LU3 | LD32 | 03 |

| MIGRATION SOURCE LU | MIGRATION SOURCE LD | MIGRATION SOURCE GROUP |
|---|---|---|
| MIGRATION TIME | | |
| LEVEL NAME | ATTRIBUTE | PATH LIMIT |
| | RAID LEVEL | |
| | STORAGE TYPE | |
| | DISK TYPE | |
| | RESPONSE SPEED | FINISH |

HOST 1 / HOST 2

| LU ID | LEVEL NAME | HBA ID | CHA ID | CURRENT PATH STATUS | PREVIOUS PATH STATUS |
|---|---|---|---|---|---|
| LU 1 | HIGH LEVEL | HBA1 | CHA1 | Online | Online |
| | | HBA1 | CHA2 | Online | Online |
| | | HBA1 | CHA3 | Online | Offline |
| | | ... | ... | ... | ... |
| | | HBA1 | CHA7 | Offline | Offline |

DEVICE AND METHOD FOR CONTROLLING NUMBER OF LOGICAL PATHS

CROSS-REFERENCE TO PRIOR APPLICATION

This application relates to and claims priority from Japanese Patent Application No. 2006-262267, filed on Sep. 27, 2006 the entire disclosure of which is incorporated herein by reference.

BACKGROUND

The present invention relates to technologies for controlling the number of logical paths between a host computer and a storage system.

Technologies relating to computer systems containing a host computer and a storage system are disclosed for example in document 1 (U.S. Patent Application No. 2006/0026346), document 2 (U.S. Patent Application No. 2005/0120259), and document 3 (U.S. Patent Application No. 2006/0047930).

Document 1 provides disclosure in regard to determining paths giving consideration to loads on a host bus adaptor (HBA), a channel adaptor (CHA), and a logical unit.

Document 2 provides disclosure in regard to a configuration in which a host and a storage system are connected by multiple paths (multi-paths).

Document 3 provides disclosure in regard to managing logical volumes in levels and moving (migrating) data to logical volumes belonging to prescribed levels.

For example, as one example of the above-mentioned various computer systems there is a computer system in which a plurality of host computers (which hereinafter may be abbreviated to "host") are connected to a same storage system. FIG. 31 illustrates one example of the computer system.

A storage system is provided with a high level storage device group and a low level storage device group for example.

The storage device groups are constituted by one or more storage devices. The high level storage device group is constituted by storage devices having high reliability or high performance for example, and the low level storage device group is constituted by storage devices having low reliability or low performance compared to the high level for example. By using the storage space of the storage device group it is possible to provide an actual logical volume (which hereinafter may be abbreviated to "VOL").

The storage system has a plurality of interfaces to the hosts (which hereinafter may be abbreviated to "host I/F") and a virtual logical volume (which hereinafter may be abbreviated to "VVOL") is provided to each host. The host I/F may be ports for example or may be CHA provided with ports. Logical paths that pass through the host I/F span between the VVOL and the host computers and the VOL are mapped to the VVOL. For example, three paths span between the host 1 and the VVOL 1 via three host I/F A, B, and C and a VOL 1 is mapped to the VVOL 1. Furthermore, three paths span between the host 2 and the VVOL 2 via three host I/F B, C, and D and a VOL 2 is mapped to the VVOL 2. The host 1 can access the VVOL 1 via any path of the three paths that span to itself. When access is received to the VVOL 1, the storage system accesses the VOL 1 that is mapped to it. That is, access to the VVOL 1 involves accessing to the VOL 1. With this configuration, the hosts 1 and 2 are unaware of the VOL 1 and 2, and therefore it is possible for example to migrate the VOL 2 from the high level storage device group to the low level storage device group as shown in the drawing without being aware of the host 2.

Furthermore, with this computer system, the plurality of host I/F A to D can be shared between the plurality of hosts 1 and 2. In the example of FIG. 31, the host I/F B and C are shared between the hosts 1 and 2.

With this computer system, as shown in the drawing, access to the VOL 2, which is considered relatively unimportant compared to the VOL 1, can impose an adverse effect on the VOL 1.

That is, there can be conflict for access to the host I/F B and C shared by the plurality of hosts 1 and 2. For this reason, access to the VOL 1 and access to the VOL 2 affects each other. Furthermore, the level of importance of the VOL 2, which has been migrated from the high level storage device group to the low level storage device group, can be considered lower than the level of importance of the VOL 1 in the high level storage device group. In this case, when access to the VVOL 1 and access to the VVOL 2 are both conducted via the host I/F B or C, an adverse effect is imposed by access to the VOL 1 by access to the VOL 2, which has a lower level of importance than that of VOL 1.

There are techniques for avoiding access conflict based on the load of the CHA or the like, but these techniques give no consideration to the level of importance of the VOL and therefore they do not always enable such problems to be avoided.

The aforementioned problem is not limited to differences when the levels of importance of the VOL are different, but may also occur when other types of conditions of the VOL are different.

SUMMARY OF THE INVENTION

Accordingly, an object of the present invention is to achieve access suited to differences in VOL conditions in a computer system in which a plurality of host computers are capable of sharing a same host I/F of a storage system.

Other objects of the present invention will become evident from the following description.

In a control device of a computer system in which a plurality of host computers are capable of sharing a same host interface of a storage system are provided: a VOL status monitoring portion that monitors a VOL status of each VOL mapped to the VVOL and determines whether or not the VOL status is changed, and a path number control portion that updates a number of paths connecting to a VVOL in which the VOL status has changed.

The number of VOL mapped to the VVOL may be singular or multiple.

The storage system may include one or multiple storage subsystems and may include switches that constitute a network. In this case, the device provided with the host interfaces may be the storage subsystems or may be the switches. The VVOL may reside in the storage subsystem and may reside in the switches. When the VVOL resides in the storage subsystem, the VOL may reside in that storage subsystem or may reside in a storage subsystem separate from that.

The control device may be a controller incorporated into the storage subsystem, may be a computer capable of communication with the storage subsystem, and a portion of a plurality of structural elements provided in the storage device may be provided in the controller of the storage subsystem while another portion resides in a computer. The computer may be a host computer that issues write requests or read requests to the storage subsystem and may be a management computer that manages the computer system.

Each of the aforementioned portions can be constructed using hardware, a computer program, or a combination of these (for example, a portion may be achieved using a computer program while a remainder is achieved using hardware). The computer program is executed by being read into a predetermined processor. Furthermore, when carrying out information processing in which the computer program is read into the processor, a storage area residing in a hardware resource such as a memory may be used as appropriate. Furthermore, the computer program may be installed onto the computer from a recording medium such as a CD-ROM or may be downloaded onto the computer via a communications network.

BRIEF DESCRIPTION OF THE DRAWINGS

FIG. 3 shows an example structure of a logical device management table;

FIG. 4 shows an example structure of a logical unit management table;

FIG. 5 shows an example structure of a level definition table;

FIG. 6 shows an example structure of a volume group management table;

FIG. 7 shows an example structure of a volume-path table;

FIG. 8A shows an example structure of an attribute table in which the type of VOL attribute is the RAID level;

FIG. 8B shows an example structure of an attribute table in which the type of VOL attribute is the type of storage subsystem;

FIG. 8C shows an example structure of an attribute table in which the type of VOL attribute is the type of storage device;

FIG. 9 shows an example structure of a volume table;

FIG. 10 shows an example structure of a volume evaluation value table;

FIG. 11 shows an example structure of an updated number of paths table;

FIG. 12 shows an example structure of a path status update candidate table;

FIG. 13 shows an example structure of a path automatic update OFF table;

FIG. 14 shows an example structure of a CHA evaluation value table;

FIG. 15 shows an example structure of a number of paths limit table;

FIG. 16 shows an example structure of a path management table;

FIG. 17 shows an example structure of a volume association table;

FIG. 18 shows an example structure of a level definition screen;

FIG. 19 shows an example structure of a path status display screen;

DESCRIPTION OF THE PREFERRED EMBODIMENT

Hereinafter, an outline of embodiments of the present invention is described.

Figure 32:
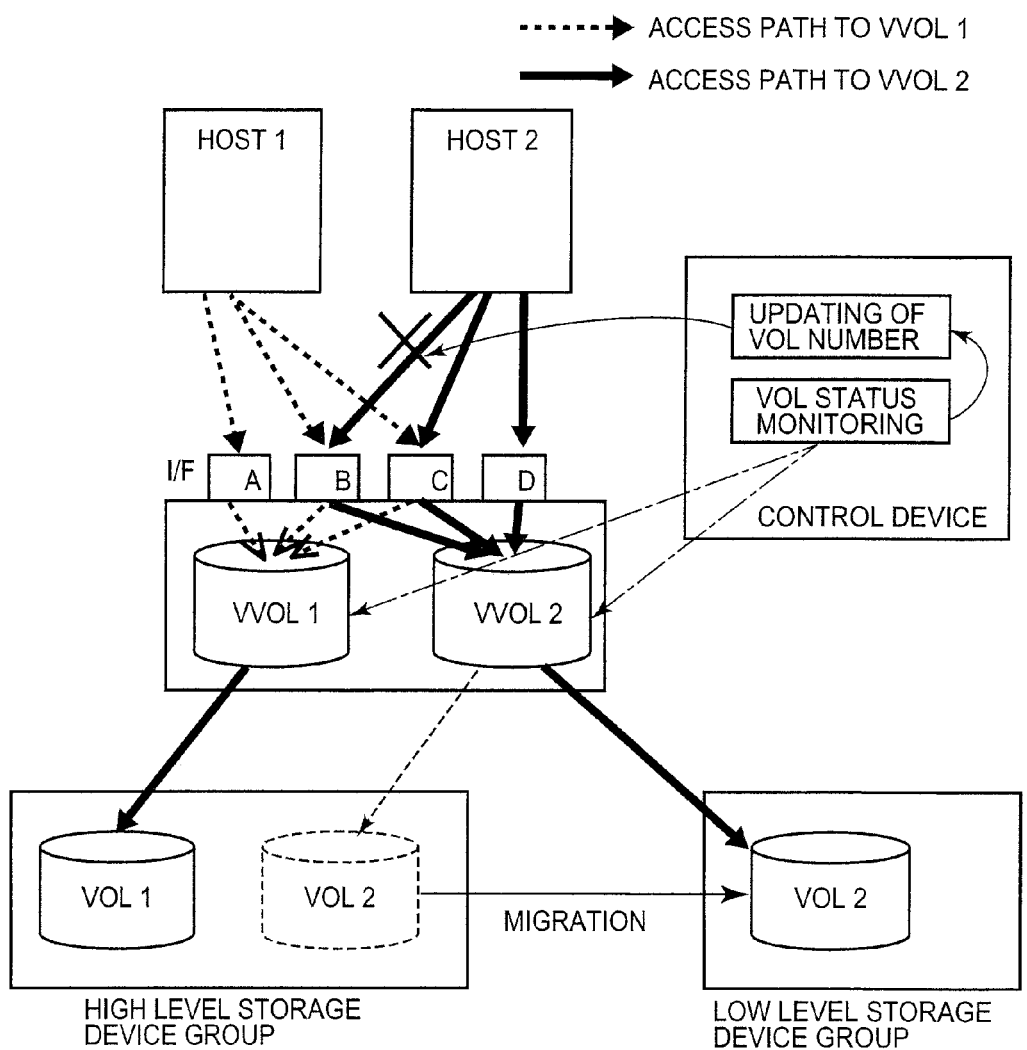
FIG. 32 is an explanatory diagram of an outline of one embodiment of the present invention.

FIG. 32 is a diagram for describing an outline of one embodiment of the present invention.

In the present embodiment, a control device monitors a VOL status of each VOL being mapped to each VVOL and determines a presence/absence of change in the VOL status. The control device then updates a number of paths (a plurality of paths shared by a host 1 and a host 2 via a host I/F) to any VVOL in which the VOL status had changed.

Specifically, a VOL 2 for example may have migrated from a high level storage device group to a low level storage device group. In this case, it would seem that the level of importance of the data in VOL 2 was lower compared to before the migration. For this reason, as shown in the drawing, the number of paths to VVOL 2, which is mapped to VOL 2, is reduced after the migration. This solves an adverse effect caused by access to VOL 2, which has a lower level of importance than access to VOL 1.

It should be noted this is configured here such that, if host I/F shared by the host 1 and 2 and host I/F that are not shared are mixed among the plurality of host I/F A to D as shown in the drawing, a check is carried out as to which are the shared host I/F, and the number of paths via shared host I/F is reduced.

Furthermore, in reducing the number of paths, it can be set so that this is not reduced below a lowest limit number of paths to be maintained (hereinafter, "lowest number of paths"). The lowest number of paths can be set in advance by a user. The lowest number of paths may be prepared for each of a predetermined reference (VOL attribute or level for example), or may be a single number without regard to a reference.

Furthermore, there are various conceivable ways of increasing/decreasing the number of paths, for example a method of updating a predefined path status (specifically, valid (online) and invalid (offline)), and a method of increasing/decreasing the actual paths (specifically, newly forming or deleting paths). In the description below, the method of updating the path status is employed to facilitate description. It should be noted that in this case, a number x of online paths to a given VVOL (paths having an online status) may be set to be freely increasable/decreasable within the following range: (predefined number of paths to the VVOL)≧x≧(lowest number of paths).

Next, the present embodiment has a number of characteristics in the above-described outline, for example three characteristics. The following is description of an outline of these characteristics.

(A) First Characteristic: Method for Determining the Number of Paths After Updating.

In the present embodiment, a VOL evaluation value focusing on a VOL attribute is calculated for each VOL. When a VOL attribute changes due to migration or the like, the number of paths after migration (in other words, the number of paths to be increased or decreased) is determined for the VVOL mapped to the VOL whose VOL attribute has changed based on the VOL evaluation value calculated based on the VOL attribute after updating.

A physical attribute relating to the physical storage device having that VOL can be used as the VOL attribute. Specifically, various attributes are conceivable as the type of VOL attribute, including for example the type of storage subsystem in which the VOL resides, the type of storage device in the storage device group in which the VOL resides, and the RAID level of the storage device group. There is a plurality of VOL attribute values for each type of VOL attribute. Then, an attribute evaluation value is set in advance for each VOL attribute value and the VOL evaluation value is calculated based on an attribute evaluation value for each VOL attribute corresponding to that VOL. Relationships between type of VOL attribute, VOL attribute values, and attribute evaluation values are illustrated in FIGS. 8A to 8C. Specifically, FIG. 8A shows an example structure of an attribute table 3011A in which the type of VOL attribute is the RAID level. FIG. 8B shows an example structure of an attribute table 3011B in which the type of VOL attribute is the type of storage subsystem. FIG. 8C shows an example structure of an attribute table 3011C in which the type of VOL attribute is the type of storage device. In each attribute table is recorded a VOL attribute value corresponding to the type of VOL attribute and an attribute evaluation value corresponding to the VOL attribute value. The type of VOL attribute, the VOL attribute value, and the attribute evaluation value can be set arbitrarily by a user (for example, an administrator to be described later).

The VOL evaluation value is for example a sum of the plurality of attribute evaluation values corresponding to the VOL. Specifically, the VOL evaluation value can be calculated by the following formula (1) for example:

*VOL* evaluation value=(attribute evaluation value corresponding to the *VOL* attribute value of the *VOL* for each type of storage subsystem)+(attribute evaluation value corresponding to the *VOL* attribute value of the *VOL* in the RAID level)+ (attribute evaluation value corresponding to the *VOL* attribute value of the *VOL* for each type of storage device)  (1)

Then, the number of paths after updating can be calculated for example by the following formula (2):

Number of paths after updating=(current number of paths)×(*VOL* evaluation value after updating÷*VOL* evaluation value before updating)  (2)

For example, in the example shown in FIG. 32, the current number of paths of the VVOL 2 mapped to VOL 2 is three. Then, the VOL evaluation value of VOL 2 changes from 8 to 5. In this case, according to the above-described formula (2), the number of paths after updating=3×(5÷8)=1.875. A predetermined method can be used to obtain an integer when the calculated value is not an integer. In the present example, 2 is obtained by rounding off at the first decimal place. The control device reduces the number of paths for the VVOL 2 from three to the calculated value two. It should be noted that in this series of processes, the control device associates the value 1.875 prior to rounding off with the number of paths being 2 after rounding off and stores this. In a subsequent calculation, use is made not of the rounded off number 2, but the value 1.875 prior to rounding off.

That is, after the number of paths for the VVOL 2 has been reduced from 3 paths to 2 paths for example, the VOL evaluation value of VOL 2 changes from 5 to 8. In this case, with the formula (2), the number of paths after updating=number of paths before updating×(8÷5), but the number of paths before updating is not the rounded value 2 and instead the pre-rounding value 1.875 is substituted in to perform the calculation. This enables the number of paths after updating to be calculated appropriately.

In this manner, in the present embodiment, the number of paths after updating is calculated based on a ratio of the VOL evaluation value after updating to the VOL evaluation value before updating and the current number of paths. That is, a value referred to as an attribute evaluation value is set with respect to the VOL attribute value and by using this attribute evaluation value it is possible to calculate a value referred to as the VOL evaluation value and to control the number of paths suited to a VOL to a suitable value based on the VOL evaluation value.

(B) Second Characteristic: Method for Determining the Number of Paths to be Increased/Decreased.

In selecting targets for increasing/decreasing paths, the VOL evaluation value is used for each host I/F in which the aforementioned VOL evaluation values are totaled for each host I/F. Hereinafter, the total of VOL evaluation values for a host I/F is referred to as a "host I/F evaluation value." The targets for path increasing/decreasing (the path status to be updated via which host I/F) can be determined for example by averaging the plurality of host I/F evaluation values. In other words, by obtaining the VOL evaluation values with a band of data access requesting the VOL and averaging these, the load on a plurality of host I/F can be distributed. In this process, when the number of paths is to be decreased for example, a path via the host I/F having the highest host I/F evaluation value is reduced (set offline) and when the number of paths is be increased, a path via the host I/F having the lowest host I/F evaluation value is increased (set online).

Figure 33:
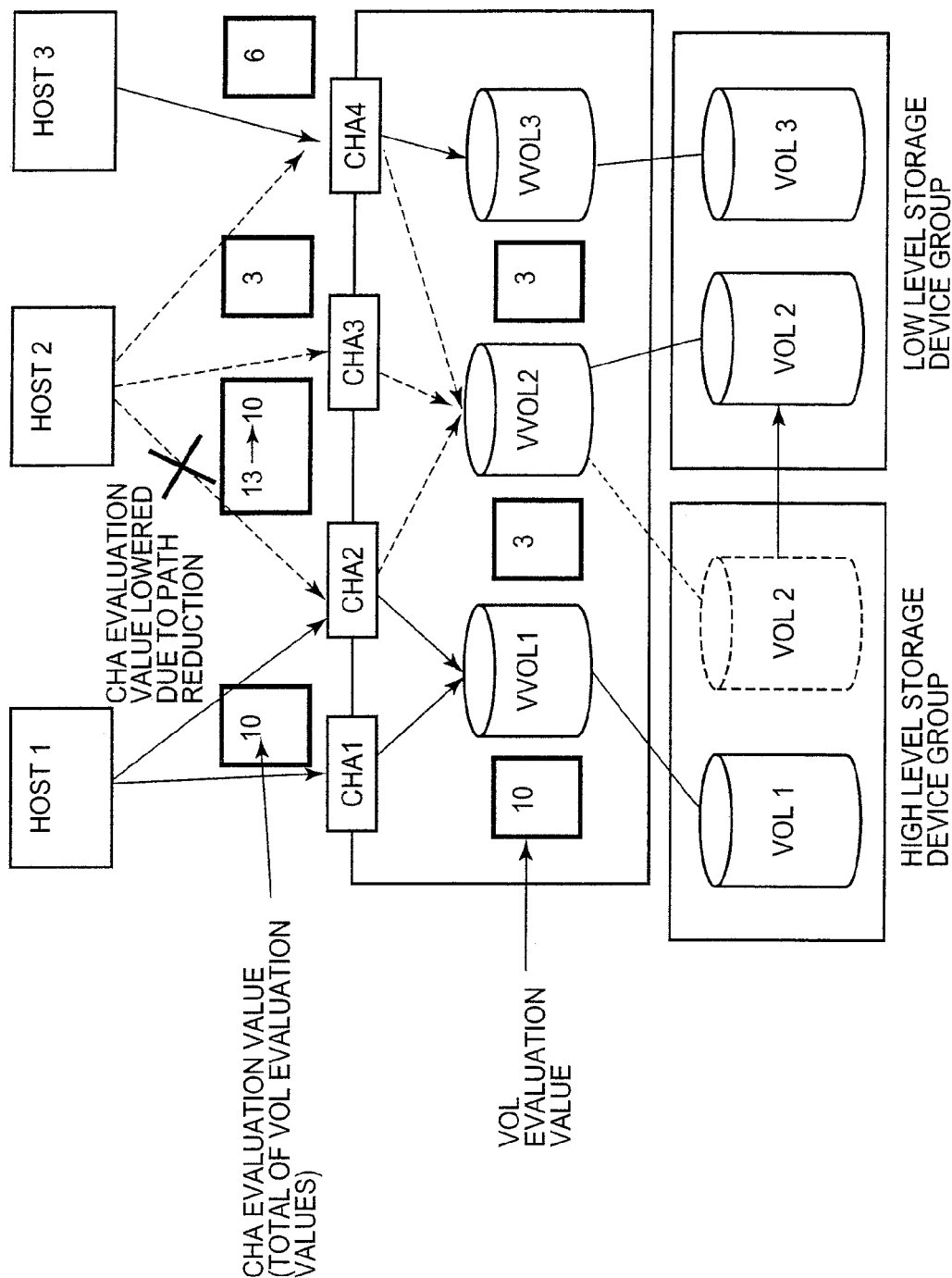
FIG. 33 shows one example of a method for determining paths to be increased/decreased.

FIG. 33 shows one example of a method for determining paths to be increased/decreased. In this example, the host I/F are CHA (channel adaptors), which are described later.

In this diagram, a CHA 2 is by a plurality of the host 1 and 2 and a CHA 4 is shared by a plurality of the host 2 and 3. By migrating the VOL 2 from the high level storage device group to the low level storage device group, the VOL evaluation value of the VVOL 2 (more accurately, the VOL evaluation value of the VOL 2 mapped to the VVOL 2) becomes 3.

In this case, a host I/F evaluation value (hereinafter, "CHA evaluation value") of the shared CHA 2 becomes 13. This is because the VVOL 1 and 2 are connected by two paths via the CHA 2, with the VOL evaluation value of the VVOL 1 being 10 and the VOL evaluation value of the VVOL 2 being 3 as mentioned above, and the aggregate of these being 13.

On the other hand, the CHA evaluation value of a different shared CHA 4 becomes 6. This is because the VVOL 2 and 3 are connected by two paths via the CHA 4, with the VOL evaluation value of the VVOL 2 being 3 as mentioned above and the VOL evaluation value of the VVOL 3 being 3, and the aggregate of these being 6.

Since the VOL evaluation value of the VOL 2 is lowered by the migration of the VOL 2, the number of paths for the VVOL 2 becomes decreased. Consequently, as to which path via which CHA to delete among the plurality of paths connected to the VVOL 2, in the present example the path via the CHA 2 is deleted as shown in the drawing. This is because of the CHA 2 and 4 shared by the plurality of hosts, the CHA 2 is the CHA with the highest CHA evaluation value.

With the above-described process it is possible to appropriately select which path via which CHA to increase or decrease.

(C) Third Characteristic: Timing of Path Updating.

Either an execution of migration or a change (raising or lowering) of the load on the host I/F (CHA for example) may be used as the timing for increasing/decreasing paths. In the case of the latter, for example, increase/decrease target path candidates are listed up at the time of migration (but path increasing/decreasing is not carried out at this time) and a search is made for the increase/decrease target path candidates that are listed up with a timing by which load change of the host I/F has been detected with the host I/F in which load change has been detected as key such that the paths that are found can be increased/decreased (made online or put offline).

Hereinafter, detailed description is given of one embodiment of the present invention. Furthermore, in the following description, when the subject is a computer program, reference is in fact being made to the process being carried out by a processor (CPU) executing that computer program. Furthermore, in the following description, the VVOL and VOL are associated on a one to one basis to facilitate description. Thus, the VOL evaluation value calculated for a given VOL is the evaluation value of the VVOL mapped to that VOL. However, when a plurality of VOL are mapped to a single VVOL, the evaluation value (level of importance) of that VVOL can be calculated based on the plurality of VOL evaluation values corresponding to the plurality of VOL respectively. For example, a total of the plurality of VOL evaluation values can be used as the evaluation value of that single VVOL. For the number of paths after updating, the VVOL evaluation value can be substituted in for the VOL evaluation value in the above-described formula (2).

Figure 1:
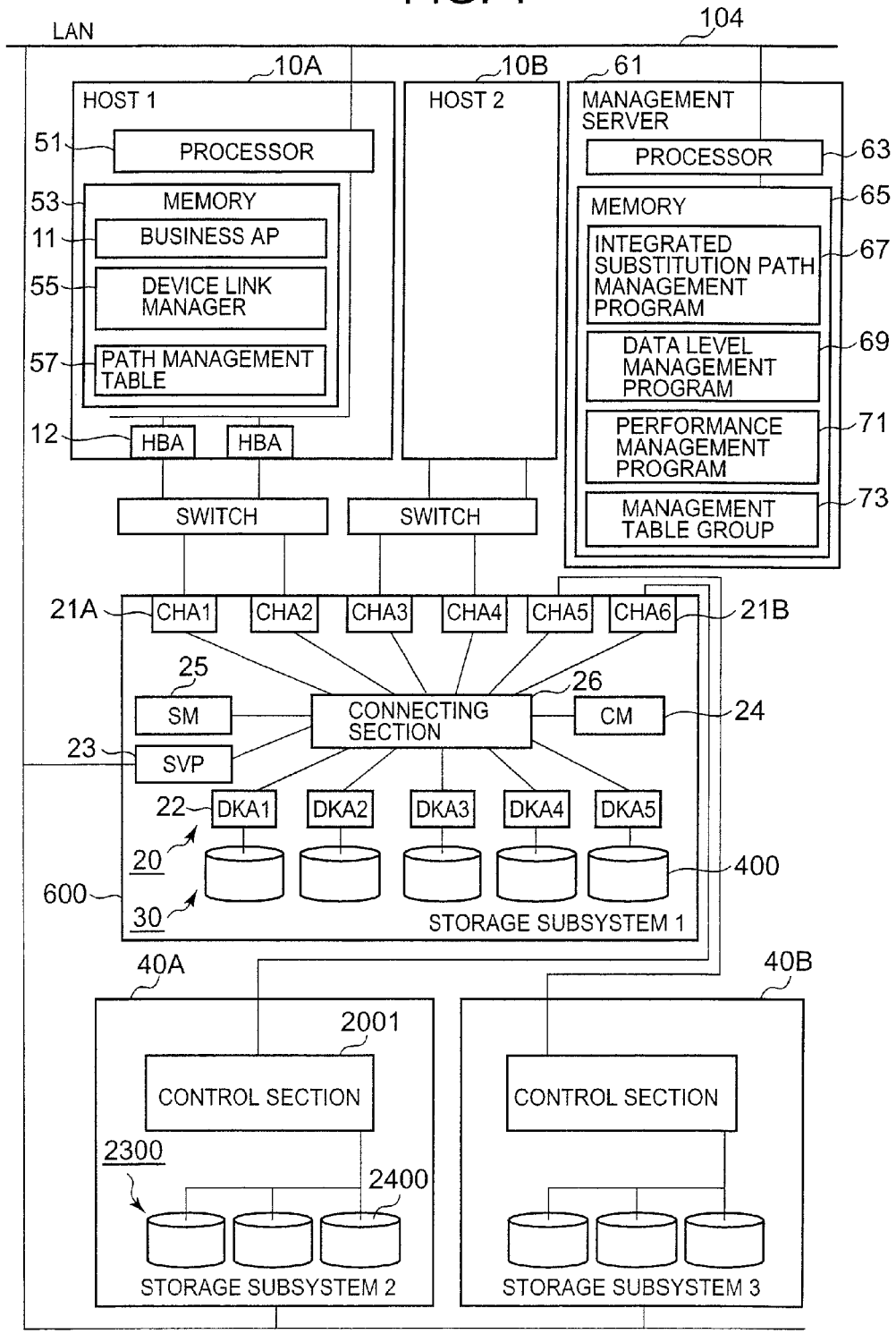
FIG. 1 is a block diagram showing an example configuration of a computer system according to one embodiment of the present invention.

FIG. 1 is a block diagram showing an example configuration of a computer system according to one embodiment of the present invention.

A plurality of host computers 10 and a storage subsystem 600 are connected in a first communications network (specifically for example, a single or multiple switches 75, which are structural elements of the first communications network). Various networks such as a SAN (storage area network) can be used as the first communications network. Furthermore, in the example of FIG. 1, there are two host computers 10A and 10B, but it is not necessary to limit this number. Hereinafter, 10A may sometimes be referred to as "host 1" and 10B may sometimes be referred to as "host 2."

The hosts 1 and 2, a management server 61, the storage subsystem 600, and storage subsystems 40A and 40B are connected in a second communications network 104. Various networks such as a LAN (local area network) can be used as the second communications network.

The structures of the hosts 1 and 2 are substantially equivalent and therefore description will be given using the host 1 as a representative example. The host 1 is a computer that issues access requests (write requests and read requests) to the VVOL of the storage subsystem 600. The host is provided with a processor (CPU) 51, storage resources, and a single or multiple HBA (host bus adaptors) 12 for example. Various storage resources such as a memory or a hard disk are employable as the storage resources but in the present embodiment this is a memory. This is also the same for the management server 61. The HBA 12 is hardware having a host to connect to the SAN, for example an interface device that supports the FC (fibre channel) protocol or the SCSI protocol. Stored in the memory 53 are a computer program that is read into and executed by the processor 51 and data used in the processor 51. Examples of the computer program include for example a business application program (hereinafter "business AP") 11 and a device link manager 55. Examples of the data include for example a path management table 57. Each of the computer programs 11 and 55 and the path management table 57 are described later.

The management server 61 is a server machine that manages a computer system containing the multiple hosts 1 and 2, and the storage subsystems 600, 40A, and 40B. The management server 61 is provided with a processor (CPU) 63 and a memory 65 for example. Stored in the memory 65 are a computer program that is read into and executed by the processor 63 and data used in the processor 63. Examples of the computer program include an integrated substitution path management program 67, a data level management program 69, and a performance monitor program 71. Examples of the data include for example a management table group 73 containing a plurality of tables. Each of the computer programs 67, 69, and 71 and the management table group 73 are described later.

The storage subsystem 600 can be a RAID (redundant array of independent (or inexpensive) disks) system for example provided with a multitude of disks 400 arranged in an array. However there is no limitation to this and the storage subsystem 600 can be configured as switches that constitute a communications network, for example, an intelligent fiber channel switch endowed with high performance. As will be described later, the storage subsystem 600 provides the storage resources of the storage subsystems 40A and 40B to a host computer 10 as its own logical volumes (logical units), and therefore may not itself possess a local storage device that it directly controls. Hereinafter, for convenience, the storage subsystem 600 may be referred to as "storage subsystem 1," the storage subsystem 40A may be referred to as "storage subsystem 2," and the storage subsystem 40B may be referred to as "storage subsystem 3."

The storage subsystem 600 can be broadly divided into a controller section 20 and a disk unit 30. The controller section 20 is provided with a channel adaptor (hereinafter "CHA") 21, a disk adaptor (hereinafter "DKA") 22, an SVP (service processor) 23, a cache memory 24, a shared memory 25, and a connecting section 26 for example.

The CHA 21 has a single or multiple communications ports that are communicably connect to an external device (a host computer or another storage subsystem for example) and carries out data communications between the external devices. In the present embodiment, a single communications port (a port enabling communication with an external device) is provided to the single CHA 21, but there may also be a plurality of communications ports. The CHA 21 is configured for example as a microcomputer system provided with a CPU and a memory and the like. A network address (for example a WWN (world wide name)) is assigned to the CHA 21 to identify the CHA 21. The CHA 21 includes a CHA 21A connected to the host computer 10 and a CHA 21B connected to storage subsystems 2 and 3. The CHA 21A and 21B may be formed integrated.

The DKA 22 has a communications port for connecting to a disk (hereinafter "internal disk") 400 that is provided in the disk unit 30 and can communicate with the internal disk 400 via this communications port. In the present embodiment, a single communications port (a port enabling communication with the internal disk) is provided to the single DKA 22, but there may also be a plurality of communications ports. The DKA 22 is configured as a microcomputer system provided with a CPU and a memory and the like. The DKA 22 is capable of writing to the internal disk 400 data that has been written from the CHA 21A to the cache memory 24 and writing to the cache memory 24 data that has been read out from the internal disk 400. Furthermore, when carrying out data input/output between the internal disk 400, the DKA 22 is capable of converting a logical address to a physical address.

The cache memory 24 is a volatile or nonvolatile memory for example and is capable of temporarily storing data such as data received from the host computer 10 and data read out from the internal disk 400. The shared memory 25 is a volatile or nonvolatile memory for example and stores information (hereinafter "control information") relating to control of the storage subsystem 1.

The connecting section 26 interconnects the CHA 21, the DKA 22, the cache memory 24, and the shared memory 25. The connecting section 26 can be configured as a high speed bus such as an ultra high speed crossbar switch that carries out data transmission by a high speed switching operation for example.

The disk unit 30 contains a plurality of internal disks 400 arranged in an array. In the present embodiment, "disk" refers to hard disks but instead of these it is possible to use disk type storage devices such as flexible disks and optical disks for example. Of course, other types of storage devices may be used instead of disks such as for example magnetic tape and semiconductor memories (flash memories for example). Actual logical volumes are provided in the storage areas of each of the above-described internal disks 400.

The SVP 23 is an information processing terminal (a notebook style personal computer for example) for carrying out maintenance and management of the storage subsystem 1. The SVP 23 is connected for example to the processor (the CPU for example) of the CHA 21 and the processor of the DKA 22 via a network not shown in the drawings. The SVP 23 is configured to monitor and display on a display screen any occurrence of failure in the storage subsystem 1 and to indicate blocking processes or the like of the internal disk 400. Furthermore, the SVP 23 can also be operated from a remote information processing terminal.

The storage subsystems 2 and 3 are provided with a controller section 2001 and a disk unit 2300 for example. The configuration of the controller section 2001 may be the same as the storage subsystem 1 or may be a different configuration (for example, a circuit board provided with a processor and a memory). The disk unit 2300 has a single or multiple disks (hereinafter "external disks") 2400 and actual logical volumes are provided in the storage areas of one or more of the external disks 2400.

The foregoing showed an example configuration of a computer system according to the present embodiment. It should be noted that the above description was one example and that other configurations may be employed. For example, instead of being on separate individual memories, the shared memory 25 and the cache memory 24 may be provided on a single memory with a shared memory area and a cache memory area. Furthermore, for example, the controller section 20 may be a circuit board provided with a CPU, a memory, and a communications port. In this case, the CPU can execute processes carried out by multiple CHA and DKA.

Figure 2:
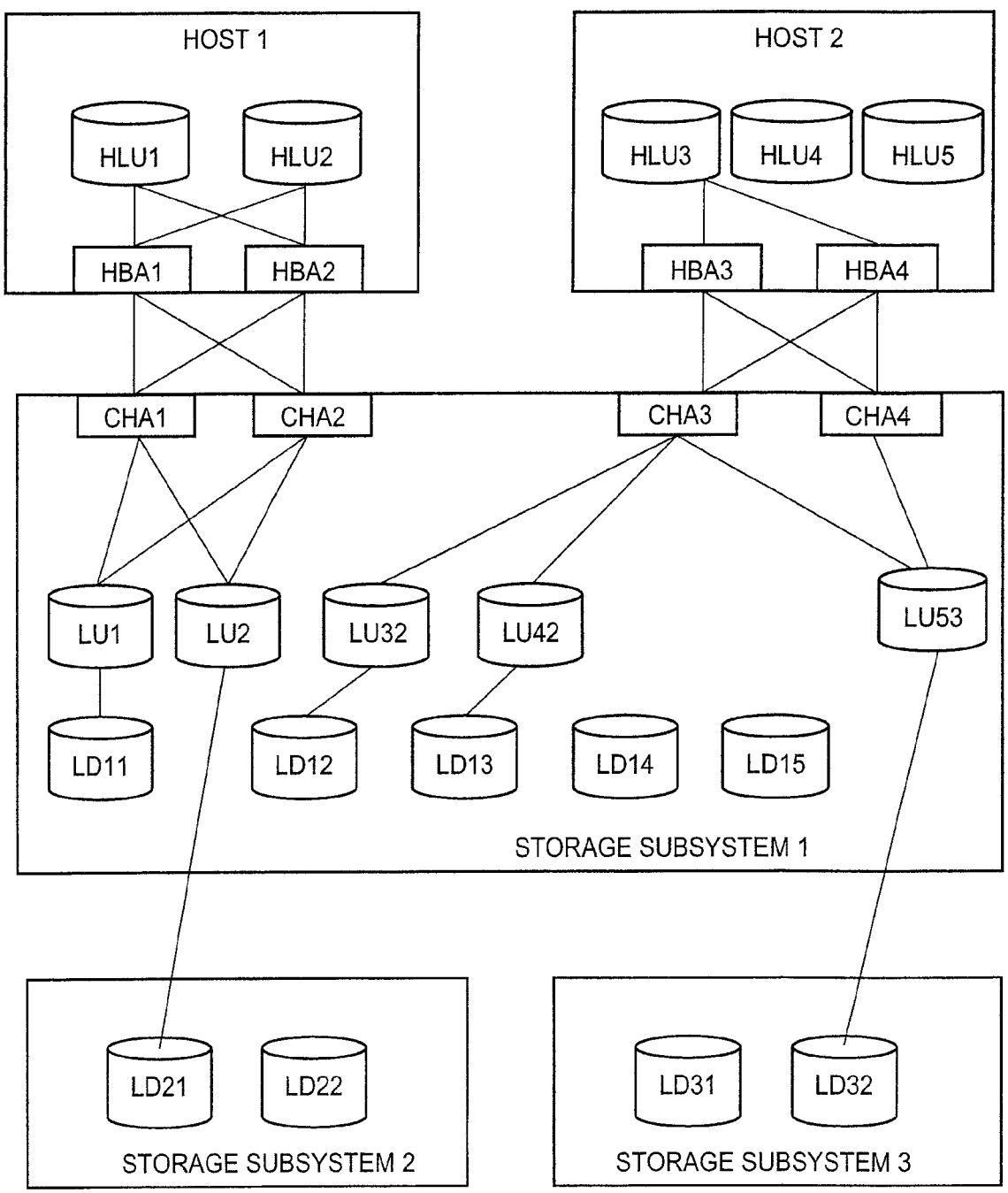
FIG. 2 shows one example of a logical configuration between hosts and storage subsystems.

FIG. 2 shows one example of a logical configuration between hosts and storage subsystems.

The hosts have HLU (host logical units). The HLU are logical storage areas provided in the hosts. The business AP 11 can issue access requests to the HLU. An access request issued to an HLU 1 is sent from the host to the storage subsystem 1 as an access request to an LU 1 corresponding to the HLU 1.

The LU (logical unit) is a virtual logical volume provided to the host by the processor of the CHA and corresponds to the above-described VVOL. The LU can include an LU identifier for example, specifically an LUN (logical unit number) for example.

The LD (logical device) correspond to the above-described VOL. The LD are logical volumes generated based on storage spaces of a RAID group (two or more storage devices formed by RAID) for example.

The connections between the HLU and the LU are logical paths to the LU and indicate online paths. In other words, even if a path is defined between the HBA 3 and the CHA 2 for example, that path is not shown if the path is offline.

The connections between the LU and the LD indicate the LD that are mapped to the LU.

In the example shown in the drawing, when there is an access request to the LU 1, access is generated to the LD 11 inside the storage subsystem 1 having the LU 1. On the other hand, when there is an access request to the LU 2, access is generated to the LD 21 of the external storage subsystem 2 of the storage subsystem 1 having the LU 2.

Incidentally, the host 1 is unaware that the LD 21 resides in the external storage subsystem 2. In other words, the storage resources of the external storage subsystem 2 are used as the storage resources of the storage subsystem 1. This external connection technology can be incorporated in technologies disclosed in Japanese patent application JP 2005-107645 A (U.S. application Ser. No. 10/769,805, U.S. patent Ser. No. 11/471,556) for example.

FIGS. 3 to 17 show example structures of various types of tables. The tables of FIGS. 3 to 15 are tables contained in a management table group 73 of a management server 61. The table of FIG. 16 is a path management table 57 in the host 1. The table of FIG. 17 is a table in the storage subsystem 1.

Hereinafter, detailed description is given concerning these various types of tables.

FIG. 3 shows an example structure of a logical device management table.

Information relating to the LD is registered for each LD in a logical device management table 3001. Specifically, for example, recorded in the table 3001 for each LD are an ID (logical device ID) of the LD, a storage subsystem identifier (storage subsystem ID) of that LD, and an identifier (physical ID) of the physical storage area (disk for example) that has been set for that LD. Also recorded for each LD is an assignment status indicating whether or not the LD is assigned to an LU, a storage capacity (capacity) of the LD, the RAID level of the RAID group to which the LD belongs, the type of storage subsystem of the LD, and the type of disk (type of storage device) of the LD.

Attributes of the LD, in other words, attributes of the LU to which the LD is mapped include capacity, rotation direction RAID level, storage subsystem type, and storage device type. Attributes such as the response speed of the disk belonging to the LD and the RPM of the disk belonging to the LD may be registered in addition to or replacing at least one of these attributes.

Furthermore, in the present embodiment "disk" refers to hard disks and therefore the storage device type is the type of hard disk drive (FC or SATA for example). However, when for example a plurality of types of storage devices are mixed (for example, hard disk drives and flash memory devices) the storage device type may be set as the type of storage device itself.

FIG. 4 shows an example structure of a logical unit management table.

A logical unit management table 3003 is a table that indicates a correspondence between the LU and the LD. In FIG. 4, an example is shown in which a single LD is assigned to a single LU but multiple LD may be associated with a single LU. In the table 3003 are recorded for example a host identifier (host ID), an LU identifier (logical unit ID) supplied to the host, and an LD identifier (logical device ID) mapped to the LU.

FIG. 5 shows an example structure of a level definition table.

A level definition table 3005 is a table in which levels defined by a data level management program 69 are recorded. There can be three levels, for example, high, mid, and low, but there may be less or more levels. Furthermore, the expression "level" is used for convenience in the description of the present embodiment, but this does not refer to the height of the physical level in which the LD resides, rather it refers to the importance of the VOL. Specifically for example, in terms of the height of the physical level, the LD residing in the storage subsystem 1 would be higher than the LD residing in the storage subsystem 2 or 3, but with the "levels" referred to in the present embodiment this is not necessarily the case. The height of the levels is determined in terms of which level is defined in which manner.

Specifically for example, level names, multiple types of VOL attributes, path limits, and migration times can be defined in levels. The level names are names defined by a user (administrator) of the management server 61 for example. Furthermore, various VOL attributes (for example, an item called "RAID level", various values corresponding to VOL attributes (for example "RAID 0+1"), path limit values, and migration time values for example are set by the administrator. Path limit refers to a necessary minimum number of paths. Migration time refers to the timing of migration, specifically for example there are a timing by which migration is executed immediately after the migration source LU has been selected and a timing by which migration is not carried out immediately upon selection of the migration source LU but rather migration is executed when the load of the CHA via the path to the migration source LU has reduced.

Conditions are set within the level definition table 3005 to allow LD required by the administrator to be searched from among the LD contained in the storage subsystems 1, 2, and 3. When a level name is selected, an LD that meets the value set in the VOL attribute is specified from the logical device management table 3001 of FIG. 3.

FIG. 6 shows an example structure of a volume group management table.

A volume group management table 3007 is a table for managing volume groups. Volume group refers to a plurality of LD or a plurality of LU organized as a single entity. A volume group can be configured organized for each application that uses data or organized for each type of data.

In the present table 3007, a group name and a volume is described for each volume group for example. The group name is a name set by the administrator for example. The volume ID is an LU ID or an LD ID set by the administrator for example.

When migrating an LD, the migration source can be specified by volume group units. In this way, the troublesomeness of specifying each single migration source can be eliminated. It should be noted that when a volume group is configured with a plurality of LU, each of the LD mapped to the LU becomes the migration source. Furthermore, when a volume group is configured with a plurality of LD, the plurality of LD are respectively the migration sources.

FIG. 7 shows an example structure of a volume-path table.

A volume-path table 3009 is for registering the logical access routes (that is, paths) from the HBA of the host to the LU. That is, information expressing a definition of a path configuration for each path is registered in the table 3009. Paths are defined by which LU they are linked to via which CHA from which HBA of which host. In other words, a path can be defined by a combination of the host ID, the HBA ID, the CHA ID, and the LU ID. The path status expresses whether that path is valid (online) or invalid (offline).

The path management table 57 (see FIG. 16) is stored in each of the hosts 1 and 2, but the table 3009 integrates the plurality of path management tables 57 residing in the plurality of hosts 1 and 2. When the host ID, the HBA ID, the CHA ID and the LU ID have been set in the table 3009, the management server 16 sends the HBA ID, the CHA ID, and the LU ID that have been set to the host corresponding to that host ID. This enables the host that receives these items of information to set the received information in the path management table 57 held in that host.

FIGS. 8A to 8C show example structures of attribute tables. These attribute tables have already been described and therefore description of them is omitted here.

FIG. 9 shows an example structure of a volume table.

A volume table 3013 is a table for managing a relationship between the LU and the levels. In the table 3013 are recorded for example the host ID, the LU ID, the number of paths, the number of online paths, the calculated number of paths, and the type of level. The number of paths is a value indicating how many paths exist between the host having the host ID corresponding to that number of paths and the LU having the LU ID corresponding to that number of paths. The number of online paths is a value indicating how many of these paths are currently online, specifically, a value after rounding off a value calculated by a calculation formula (the above-described formula (2)) of the number of paths after updating. The calculated number of paths is the actual value calculated by the aforementioned calculation formula (that is, the value before rounding off). The type of level is a value indicating the level of the LD mapped to the LU having the LU identifier corresponding to that type of level.

FIG. 10 shows an example structure of a volume evaluation value table.

A volume evaluation value table 3015 is a table in which VOL evaluation values for each LU are stored. Registered in the table 3015 for each LU are for example the ID of the host used by the LU, the ID of LU, the VOL evaluation value of the LU, the LU evaluation value maximum value. The VOL evaluation values are calculated based on the attribute tables 3011A to 3011C illustrated in FIGS. 8A to 8C and the volume table 3013 illustrated in FIG. 9. The evaluation value maximum value is the maximum value in the history of updates of the VOL evaluation values.

FIG. 11 shows an example structure of a number of paths for updating table.

A number of paths for updating table 3017 is a table indicating a number of paths to be increased/decreased linking to which LU via which CHA from which host. For example, registered in the table 3017 are the host ID, the LU ID, the number of paths to be updated, and the CHA ID. If there is a positive symbol (+) with the number of paths to be updated, this means that the paths will be increased and if there is a negative symbol (−), this means that the paths will be decreased.

FIG. 12 shows an example structure of a path status update candidate table.

A path status update candidate table 3019 is a table used when updating paths at a time of updating the load on the CHA without updating the path status (without increasing or decreasing paths) at the timing of execution of migration. Registered in the table 3019 is information relating to paths that have become candidates for path status updating, for example, the host ID, the HBA ID, the LU ID, the CHA ID, the path ID, and the type of operation. The type of operation indicates the path status after updating.

When executing migration, information relating to paths that are candidates for path status updating is registered in the table 3019 and when an update in the load on the CHA is detected, paths to undergo path status updating are decided from information of the paths registered in the table 3019.

FIG. 13 shows an example structure of a path automatic update OFF table.

Registered in a path automatic update OFF table 3021 is the number of paths that must be automatically updated linking which host and which LU. The host ID and the LU ID are registered in the table 3021 for example. The number of paths linking the host identified from that host ID and the LU identified from the LU ID corresponding to that host ID will not be automatically increased or decreased.

FIG. 14 shows an example structure of a CHA evaluation value table.

A CHA evaluation value table 3023 records a CHA evaluation value for each CHA. For example, the CHA ID and the CHA evaluation value are registered in the table 3023 for each CHA.

FIG. 15 shows an example structure of a number of paths limit table.

A minimum number of paths is registered in a number of paths limit table 3025. The table 3025 is referenced when decreasing the number of paths.

FIG. 16 shows an example structure of a path management table. Specifically, FIG. 16 shows an example structure of a path management table of the host 1.

Registered in the table 57 is information relating to paths (HBA ID, CHA ID, and LU ID) that has been sent from the management server 16 and the path ID, the HLU ID and the path status is also registered.

Upon receiving an access request from the business AP 11 and accepting the access request, the device link manager 55 uses the HLU ID contained in the access request to select the path to be used in sending the access request to the storage subsystem 1 from the plurality of paths specified from the path management table 57.

Specifically for example, when there is an HLU 1 due to the LU 1 being mounted in the host 1, the access request is taken in by the HLU 1. In this case, the device link manager 55 selects a single path from 14 paths corresponding respectively to the path IDs 0001 to 0014 and is able to send the access request to the LU 1. It should be noted that when there are multiple access requests, the device link manager 55 can carry out load distribution by switching the path to be used for sending to the storage subsystem 1 to a different path for every n-th (n is an integer greater than one) times of usage.

FIG. 17 shows an example structure of a volume association table.

A volume association table 3029 is table for storing the shared memory 25 of the storage subsystem 1 for example. The table 3029 is a table in which associative relationships between the LU and the LD are defined. Specifically for example, registered in the table 3029 are the ID of LU, the ID of the LD mapped to that LU, and the ID of the storage subsystem of that LD.

When there is an access request to a certain LU, the processor of the CHA in the storage subsystem 1 determines from the volume association table 3029 whether or not the LD mapped to that LU is in the storage subsystem 1, and when it is determined that this is in the storage subsystem 2 or 3, the access request to that LD can be sent to the storage subsystem 2 or 3.

FIG. 18 shows an example structure of a level definition screen.

A level definition screen 3031 is a GUI (graphical user interface) that handles definitions of levels from an administrator and is a screen displayed by the data level management program 69 for example. Through this screen 3031, the administrator can define levels. Specifically, it is possible to define levels by inputting for example the level name, the migration source group, and the various VOL attributes. Information that is inputted via the screen 3031 is registered in the level definition table 3005.

FIG. 19 shows an example structure of a path status display screen.

A path status display screen 3033 is a screen for displaying the path status in regard to each LU. The screen 3033 is displayed using the integrated substitution path management program 67 for example.

In the screen 3033, hosts can be specified using tabs. When the administrator uses an input device such as a mouse and specifies the tab of a desired host, the level name, HBA ID, CHA ID, current path status, and previous path status are displayed for LU accessible by that host. These items of information are obtained from the volume-path table 3009 (see FIG. 7) for example.

It should be noted that the level name is displayed when the LU belongs to a certain level, but when it does not belong to any level, this field is blank. Whether or not the LU belongs to a level can be determined for example using the volume table 3013 shown in FIG. 9.

Furthermore, when a level has been specified and migration has occurred, the previous path status is set to the path status prior to migration. When the LU has not migrated, this field may be left blank.

Next, description is given of one example of a process flow carried out according to the present embodiment. It should be noted that in the following description, "step" is abbreviated to "S."

Figure 29:
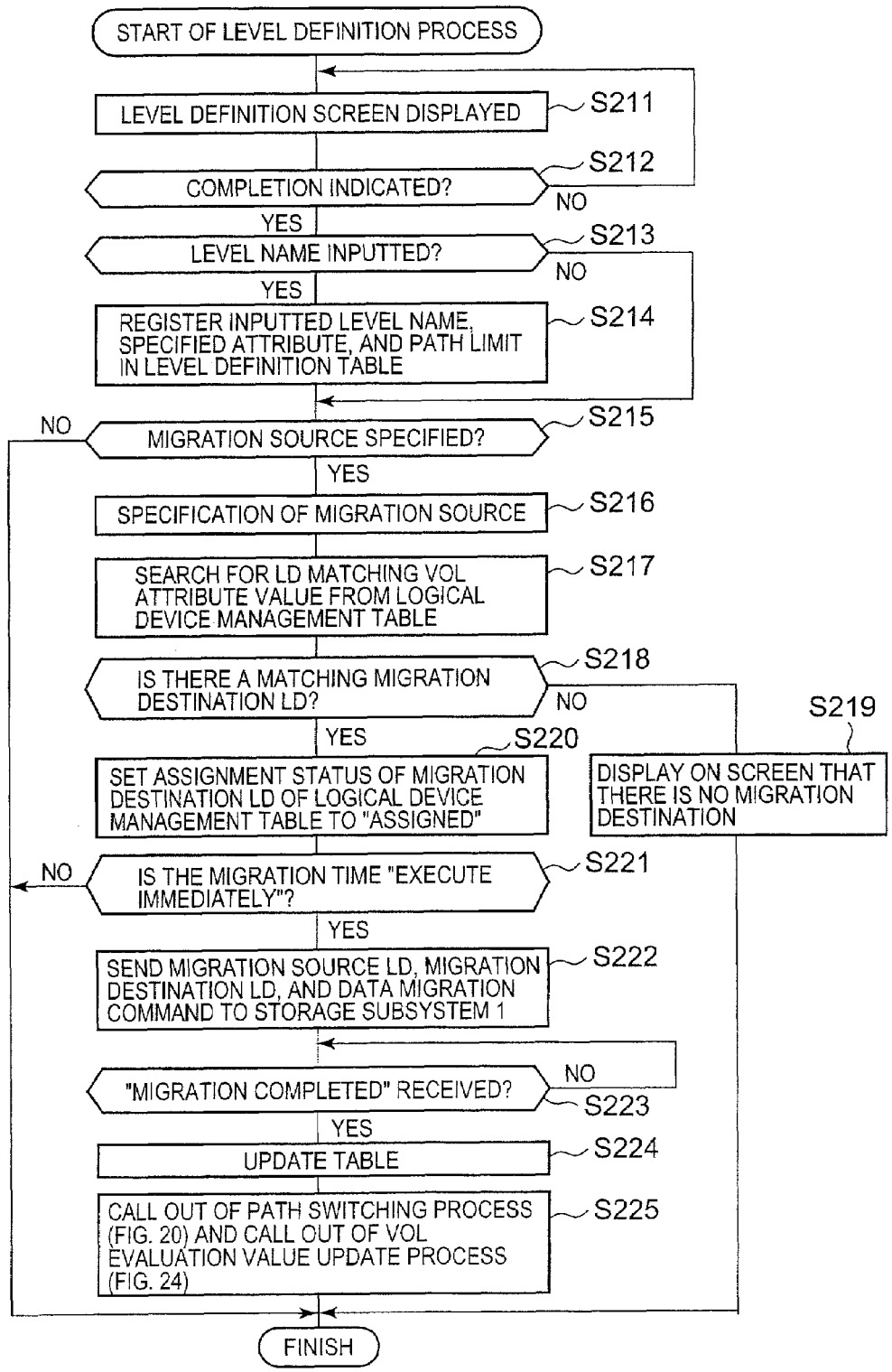
FIG. 29 shows one example of a level definition process flow.

FIG. 29 shows one example of a level definition process flow.

At S211, the data level management program 69 displays the level definition screen 3031 (see FIG. 18) in response to an instruction from the administrator. When "finish" is indicated via the level definition screen 3031 (specifically, when the "finish" button is pressed), various items of information registered in the level definition screen 3031 is inputted, YES is given at S212 and the procedure proceeds to step 213.

At S213, the data level management program 69 determines whether or not there is a level name in the inputted information. If there is a level name, the procedure proceeds to S214 and if not it proceeds to S215.

At S214, the data level management program 69 registers in the level definition table 3005 the inputted level name and such items as the specified VOL attribute value and the path limit.

At S215, the data level management program 69 determines whether or not there is information of a migration source (that is, whether or not a migration source is specified) in the inputted information. If there is information of a migration source, the procedure proceeds to S216 and if there is not, the procedure finishes.

At S216, the data level management program 69 specifies the migration source LD from the information of the migration source. If the information of the migration source is a volume group, a volume belonging to that volume group is specified by referencing the volume group management table 3007. If the specified volume or the information of the aforementioned migration source is an LU, the LD corresponding to that LU is specified by referencing the logical unit management table 3003.

At S217, the data level management program 69 references the logical device management table 3001 and obtains a single or multiple VOL attribute values (capacity for example) corresponding to the migration source LD.

At S218, the data level management program 69 references the logical device management table 3001 and determines whether or not there is an unassigned LD that matches the VOL attribute value obtained at S217. If there is not, the procedure proceeds to S219 and if there is, it proceeds to S220.

At S219, the data level management program 69 displays a screen indicating that there is no migration source.

At S220, the data level management program 69 selects an unassigned LD that matches the VOL attribute value obtained at S217 and sets the assignment status (the assignment status in the logical device management table 3001) for selected LD as "assigned," meaning that it has been assigned.

At S221, the data level management program 69 determines whether or not the information indicating the migration time, which is inputted via the level definition screen 3031, is "execute immediately." If it is, the procedure proceeds to S222 and if it is not, the procedure finishes.

At S222, the data level management program 69 sends a data migration command to the storage subsystem 1. The data migration command contains the LD ID of the migration source LD and the LD ID of the migration destination LD. When migration completion is received from the storage subsystem 1 (YES at S223) as a response to the data migration command, the procedure proceeds to S224.

At S224, the data level management program 69 updates predetermined types of tables. Specifically for example, in the logical unit management table 3003, the LD ID corresponding to the LU ID of the LU mapped to the migration source LD is updated from the LD ID of the migration source LD to the LD ID of the migration destination LD. Furthermore, if the level of the migration destination LD is different from the level of the migration source LD, the level type corresponding to the LU to which that migration destination LD is mapped in the volume table 3013 is updated to the level name of the level of the migration destination LD.

Figure 20:
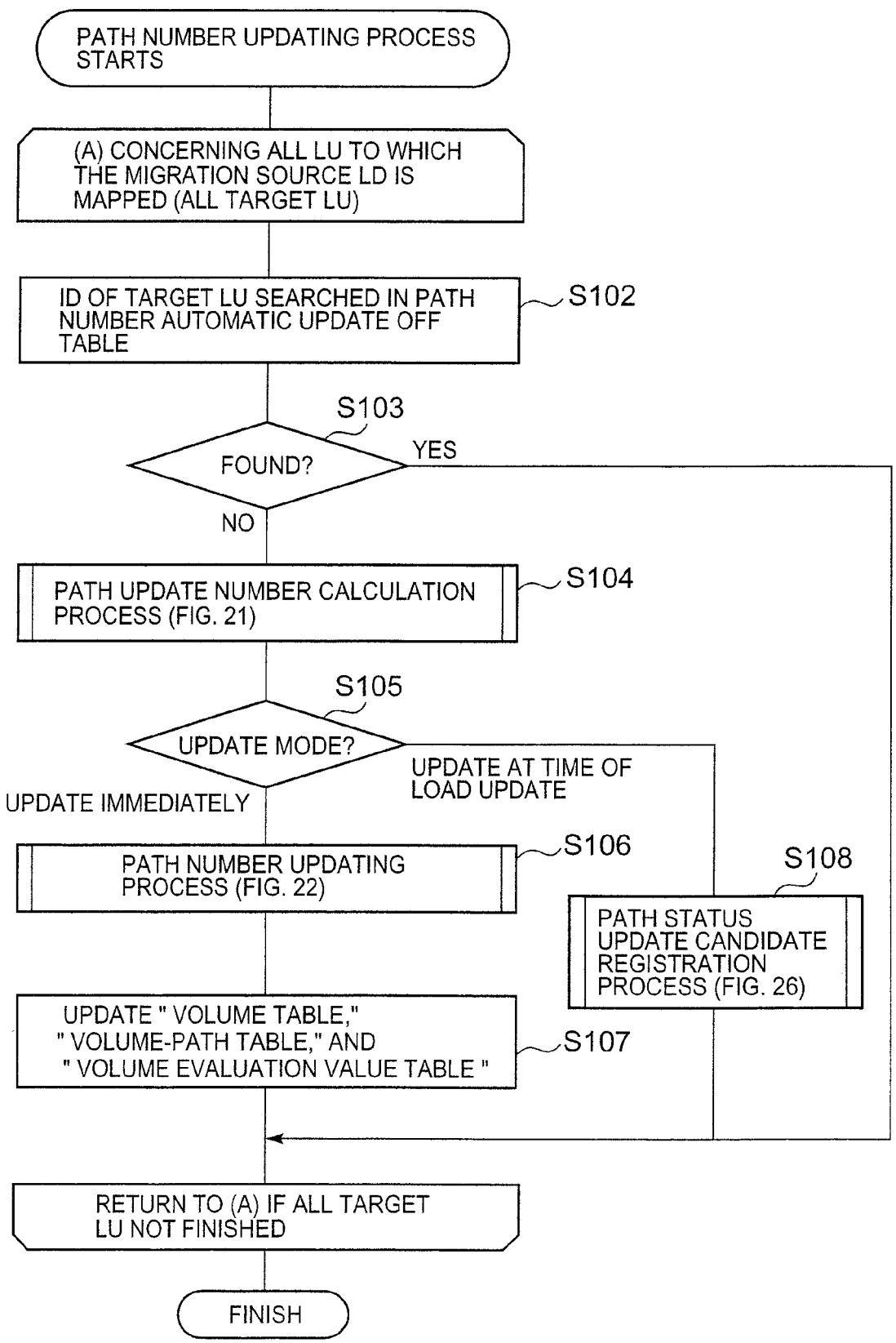
FIG. 20 shows one example of a path switching process flow.
Figure 24:
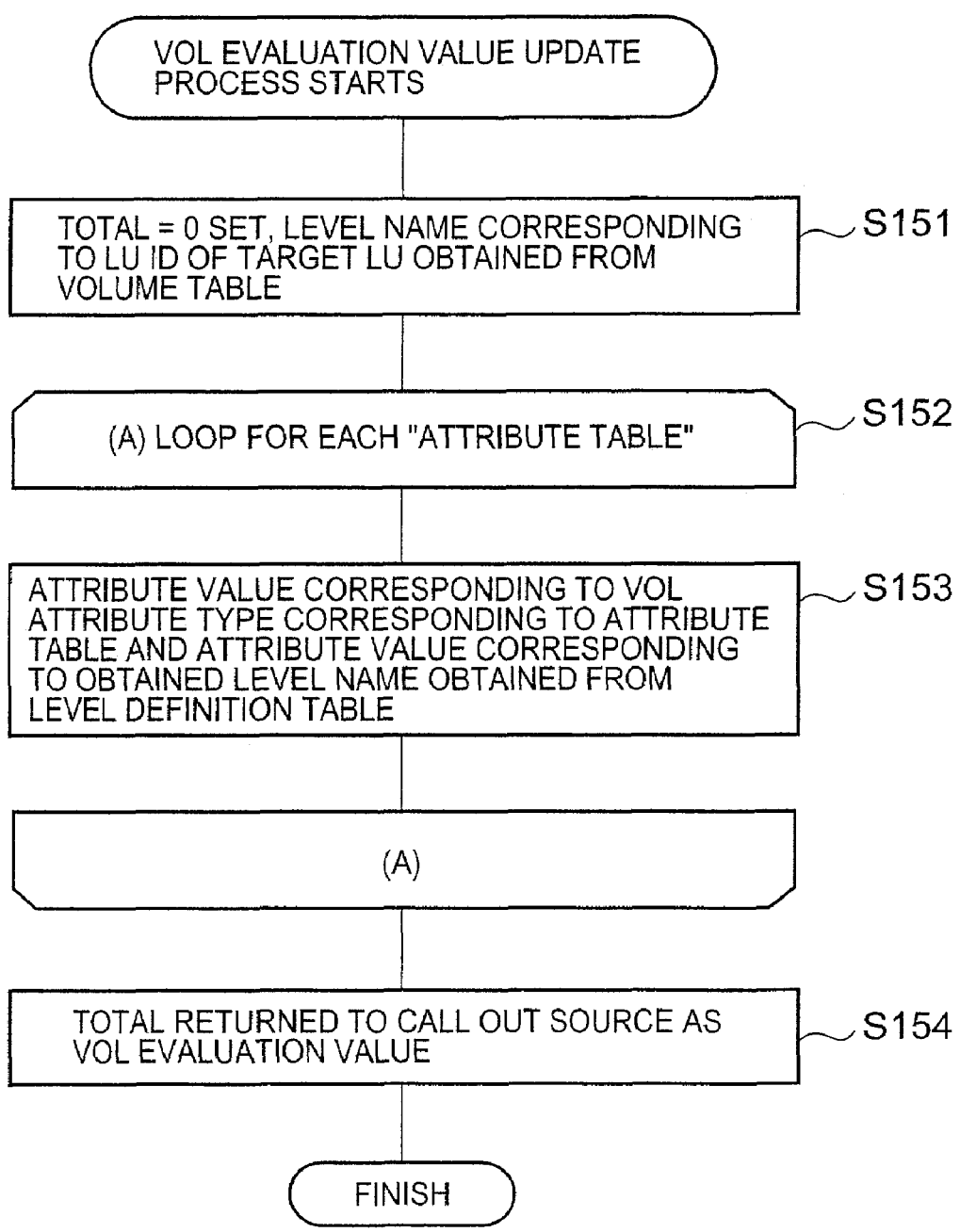
FIG. 24 shows one example of a VOL evaluation value update process flow.

At S225, the data level management program 69 carries out a first call out for executing a path switching process shown in FIG. 20 and a second call out for executing VOL evaluation value update process shown in FIG. 24. In the second call out, the LU ID of the LU mapped to the migration destination LD (hereinafter referred to as "target LU" for convenience) is inputted.

Figure 30:
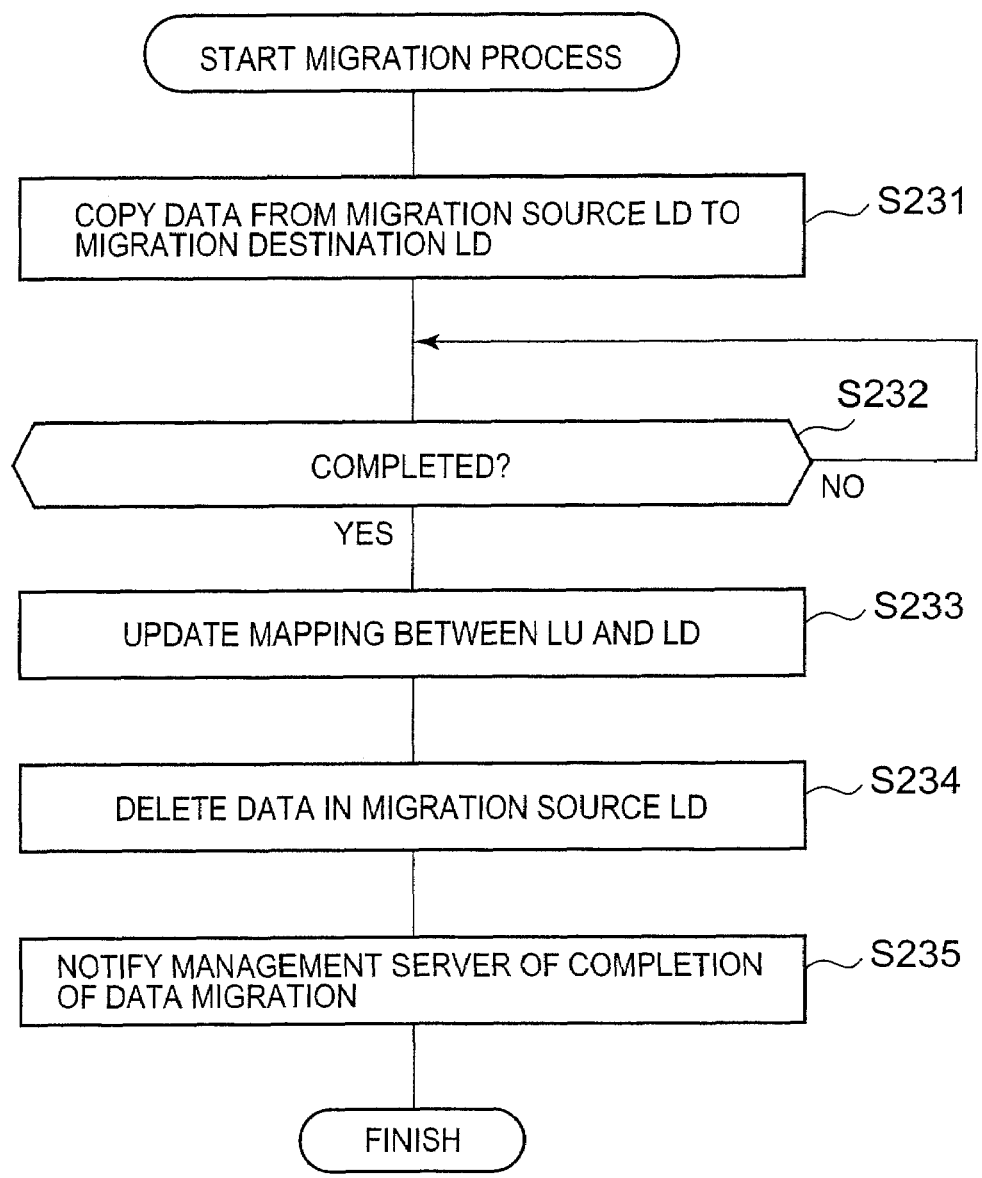
FIG. 30 shows one example of a migration process flow.
Figure 31:
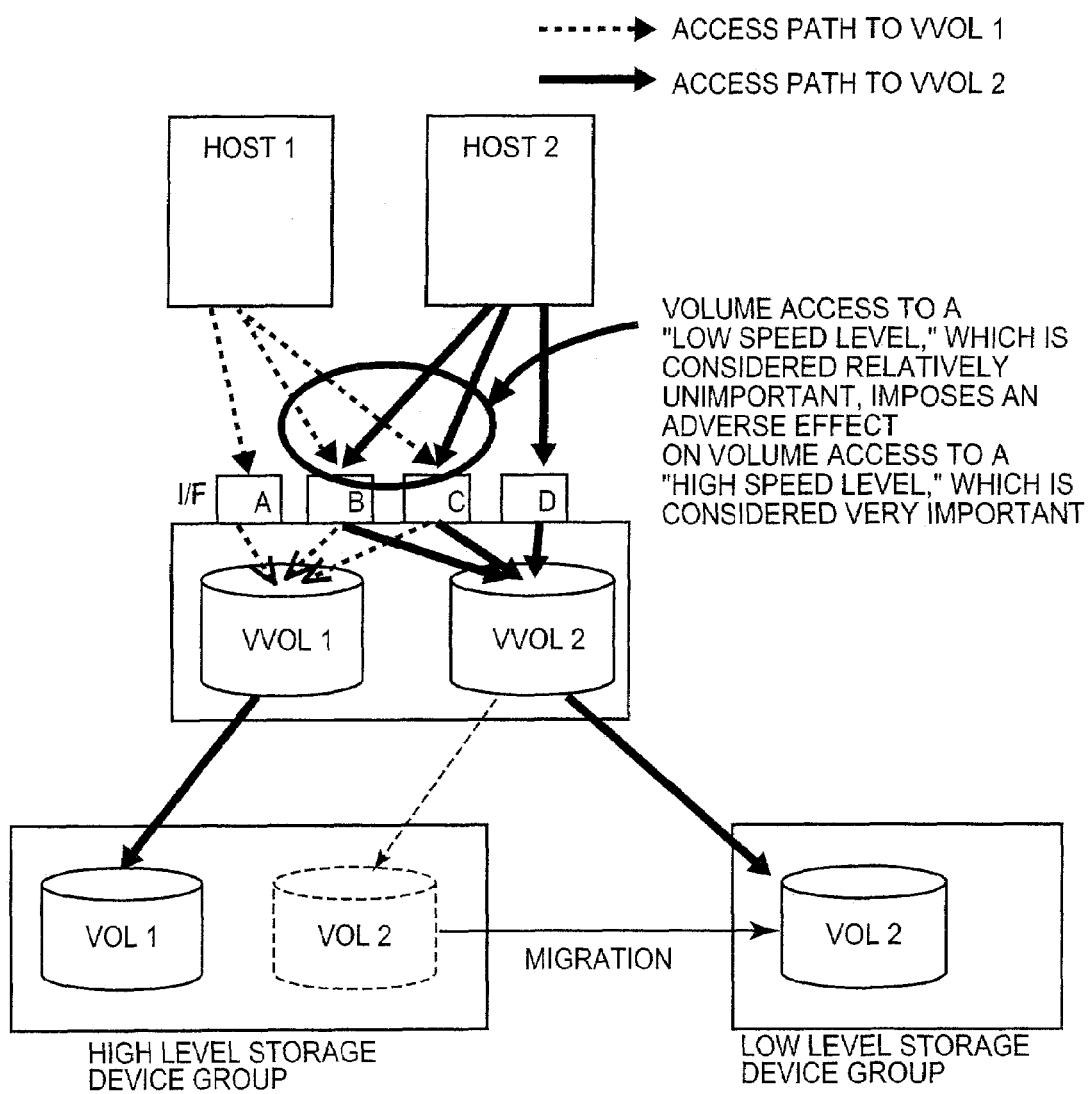
FIG. 31 is an explanatory diagram of an issue related to the present invention.

FIG. 30 shows one example of a migration process flow.

At S231, in response to the data migration command from the management server 16 (the data level management program 69), the storage subsystem 1 copies all the data in the migration source LD specified by that command to the migration destination LD specified by that command. When this is completed (YES at S232), the procedure proceeds to S233.

At S233, the storage subsystem 1 updates the LD mapped to the LU to the LD of the migration destination. Specifically for example, when the data in the LD 11 has been copied to the LD 31 in FIG. 2, the LD ID "LD 11" corresponding to the LU ID "LU 1" in the volume association table 3029 is updated to "LD 31" and the storage subsystem ID is updated from "01" to "03."

At S234, the storage subsystem 1 deletes the data in the migration source LD.

At S235, the storage subsystem 1 notifies the management server 16 that migration is completed.

FIG. 20 shows one example of a path switching process flow.

At the aforementioned first call out, the integrated substitution path management program 67 is started up. The integrated substitution path management program 67 executes S102 to S108 for the LU (target LU) mapped to the migration destination LD in FIG. 30.

At S102, the integrated substitution path management program 67 references the path number automatic update OFF table 3021 and searches for the ID of the target LU. If found (YES at S103), the path switching process is finished, if not found (NO at S103), the procedure proceeds to S104.

Figure 21:
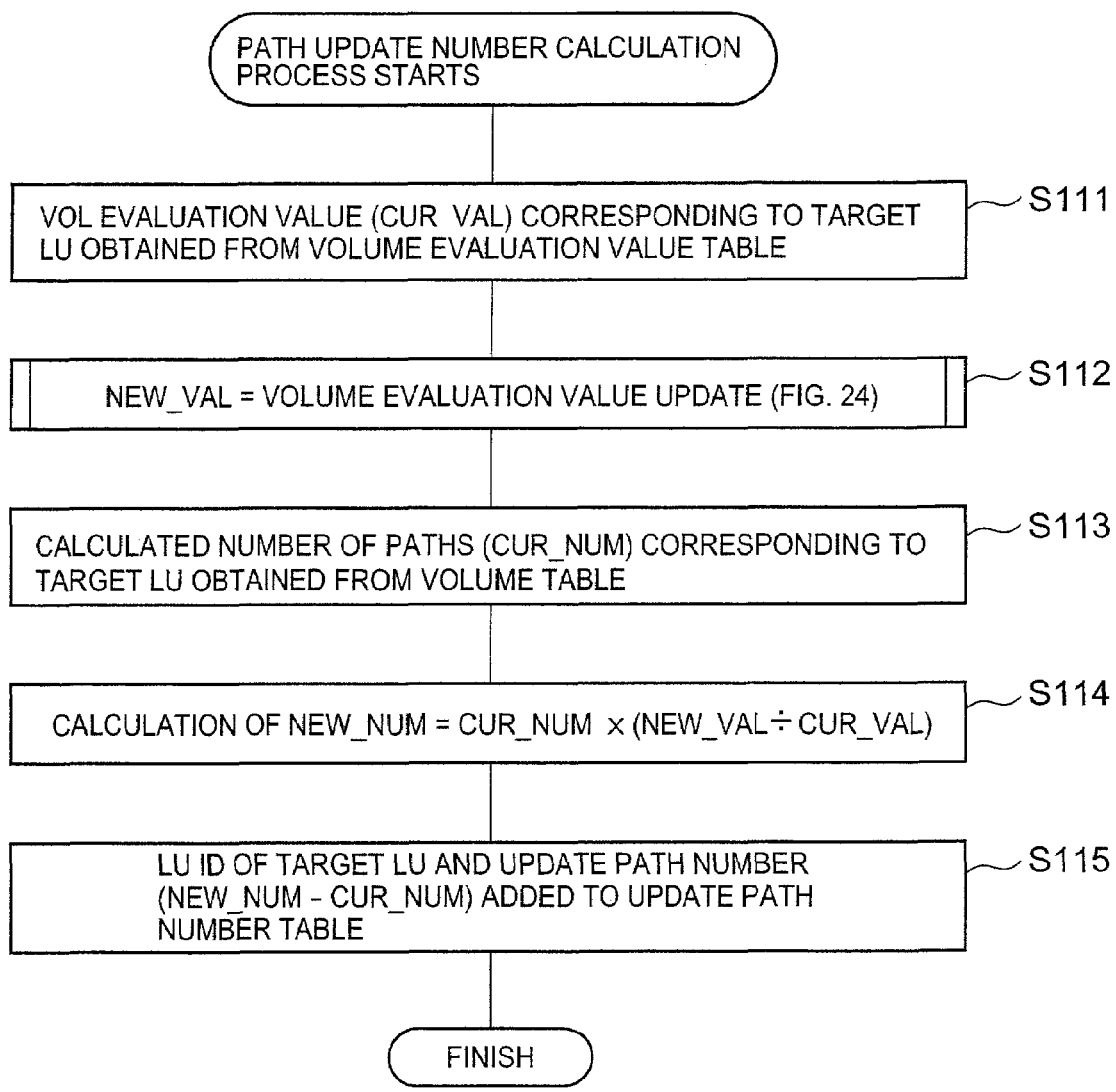
FIG. 21 shows one example of a path update number calculation process flow.

At S104, the integrated substitution path management program 67 carries out a third call out for executing the path update number calculation process shown in FIG. 21.

At S105, the integrated substitution path management program 67 determines the path updating mode. "Path updating mode" indicates the timing of path updating, specifically there are the migration time and the CHA load updating time. The updating mode is set by the administrator in the integrated substitution path management program 67 for example, but it may also be set for each VVOL. If this is the migration time, then the procedure proceeds to S106, and if it is the CHA load updating time, the procedure proceeds to S108.

Figure 22:
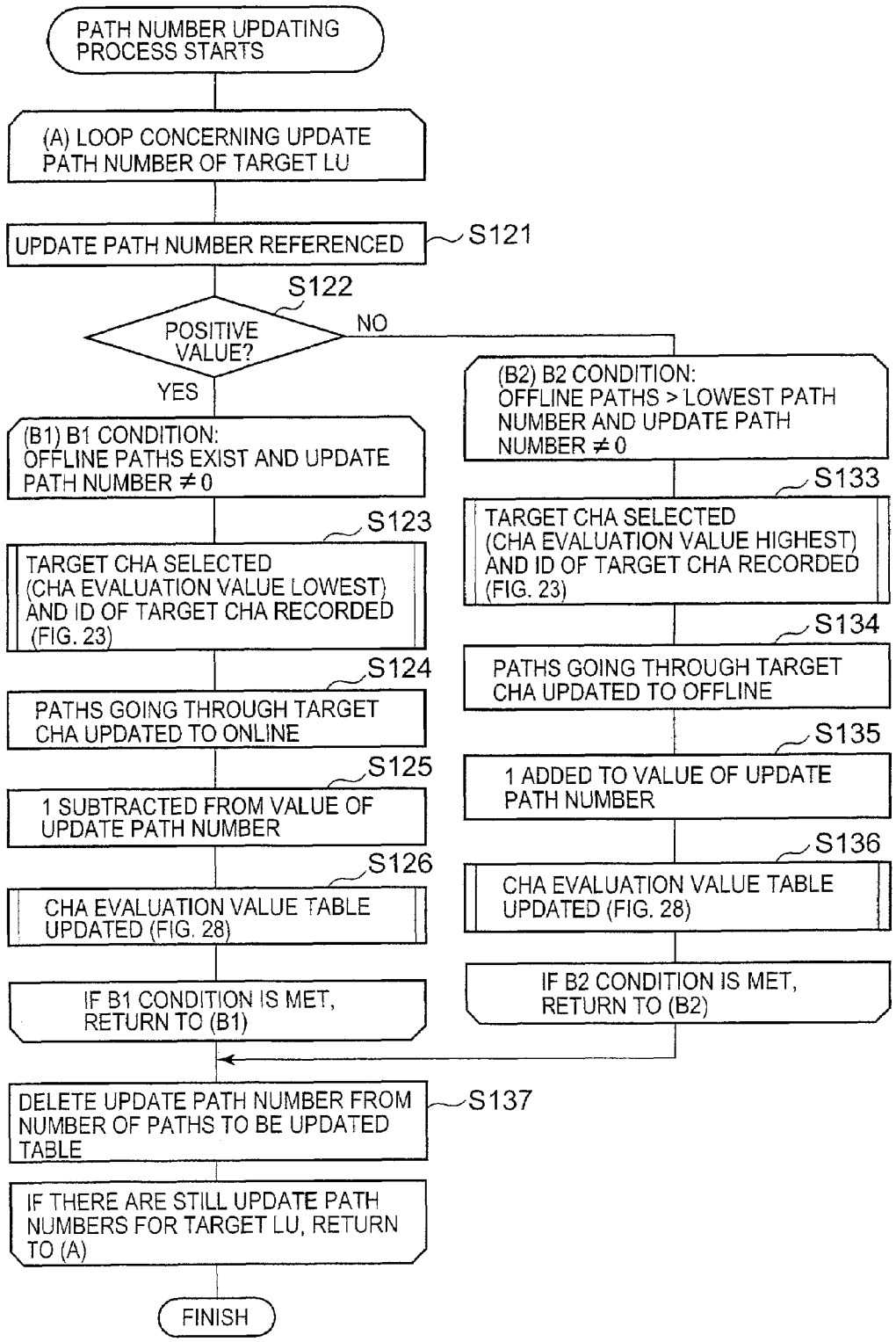
FIG. 22 shows one example of a path number updating process flow.

At S106, the integrated substitution path management program 67 carries out a fourth call out for executing the path number updating process shown in FIG. 22.

At S107, based on a result of the path number updating process, the integrated substitution path management program 67 updates the volume table 3013 (see FIG. 9), the volume-path table (see FIG. 7), and the volume evaluation value table 3015 (FIG. 10).

Figure 26:
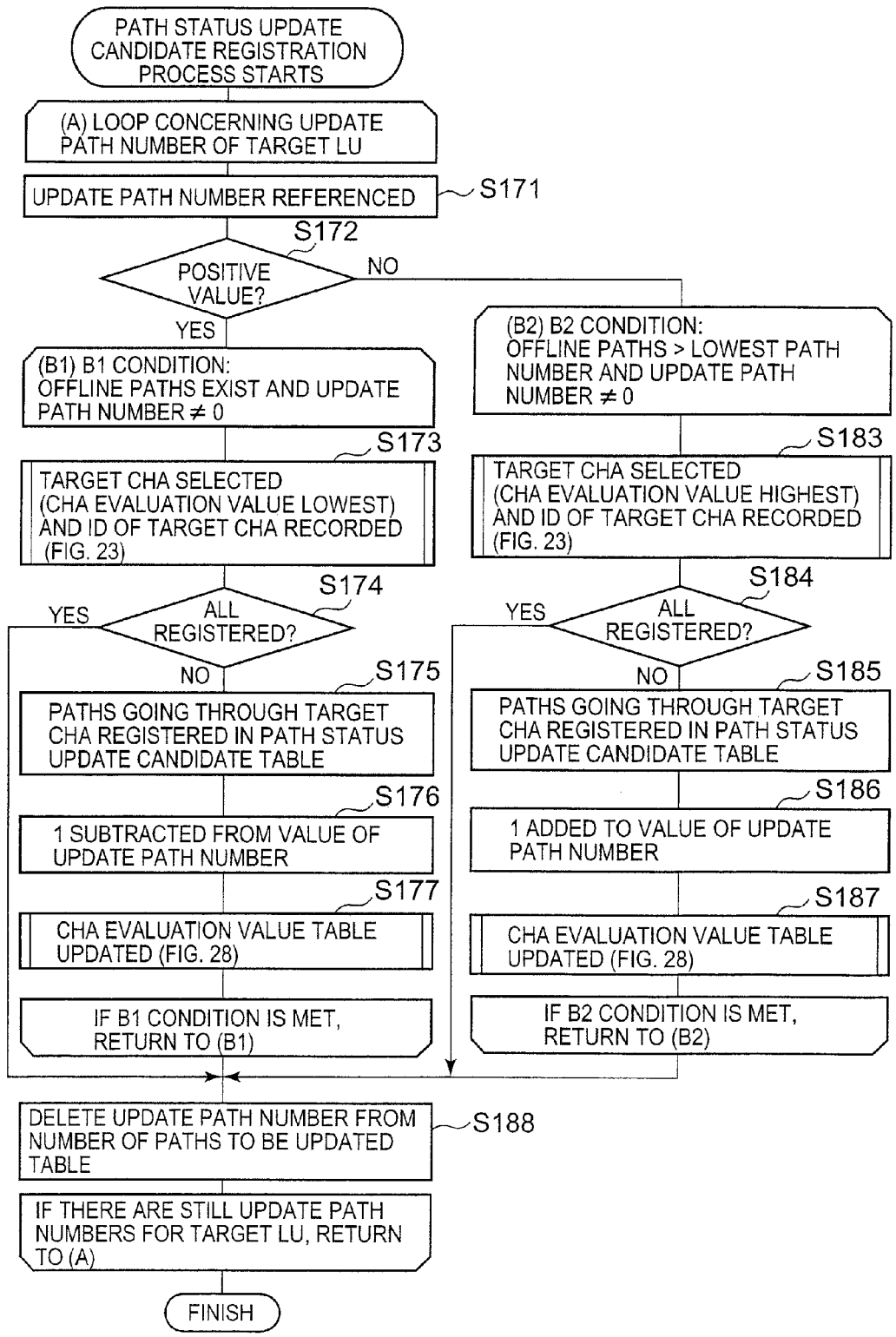
FIG. 26 shows one example of a path status update candidate registration process flow.

At S108, the integrated substitution path management program 67 carries out a fifth call out for executing the path status update candidate registration process shown in FIG. 26. At the fifth call out, the LU ID of the target LU is inputted.

FIG. 21 shows one example of a path update number calculation process flow.

At S111, the integrated substitution path management program 67 obtains a VOL evaluation value (CUR_VAL) corresponding to the ID of the target LU from the volume evaluation value table 3015.

At S112, the integrated substitution path management program 67 carries out a sixth call out for executing the VOL evaluation value update process shown in FIG. 24. The VOL evaluation value obtained as a result of the VOL evaluation value update process executed due to the sixth call out is set as a new value (NEW_VAL).

At S113, the integrated substitution path management program 67 obtains the calculated number of paths (CUR_NUM) corresponding to the ID of the target LU from the volume table 3013. The number of online paths may be obtained as the CUR_NUM.

At S114, the integrated substitution path management program 67 calculates the formula (2), namely: number of paths after updating (NEW_NUM)=(current number of paths) (CUR_NUM)×(VOL evaluation value after updating (NEW_VAL)÷VOL evaluation value before updating (CUR_VAL)). The number of paths after updating (NEW_NUM) that is calculated is recorded in the volume table 3013 as the number of online paths at S107 of FIG. 20. Furthermore, the value of NEW_NUM before rounding off is recorded in the volume table 3013 as the calculated number of paths at S107 of FIG. 20.

At S115, the integrated substitution path management program 67 adds the LU ID of the target LU to the number of paths for updating table 3017 (see FIG. 11) and registers in the number of paths for updating table 3017 a value of subtracting the CUR_NUM (this "CUR_NUM" is the number of online paths) from the NEW_NUM as the number of paths for updating corresponding to the LU ID.

FIG. 22 shows one example of a path number updating process flow.

This is executed by the aforementioned fourth call out. At the fourth call out, the LU ID of the target LU (that is, the ID of the LU targeted for path updating) is inputted. The integrated substitution path management program 67 references the number of paths for updating table 3017 and if there is an update path number for the inputted LU ID, executes the procedure from S121 onward.

At S121, the integrated substitution path management program 67 references the update path number corresponding to the target LU. If the value of the update path number is a positive value (YES at S122), this means that the paths are to be increased and therefore the processes of S123 to S126 are carried out. On the other hand, if the value of the update path number is a negative value (NO at S122), this means that the paths are to be decreased and therefore the processes of S133 to S136 are carried out.

Figure 23:
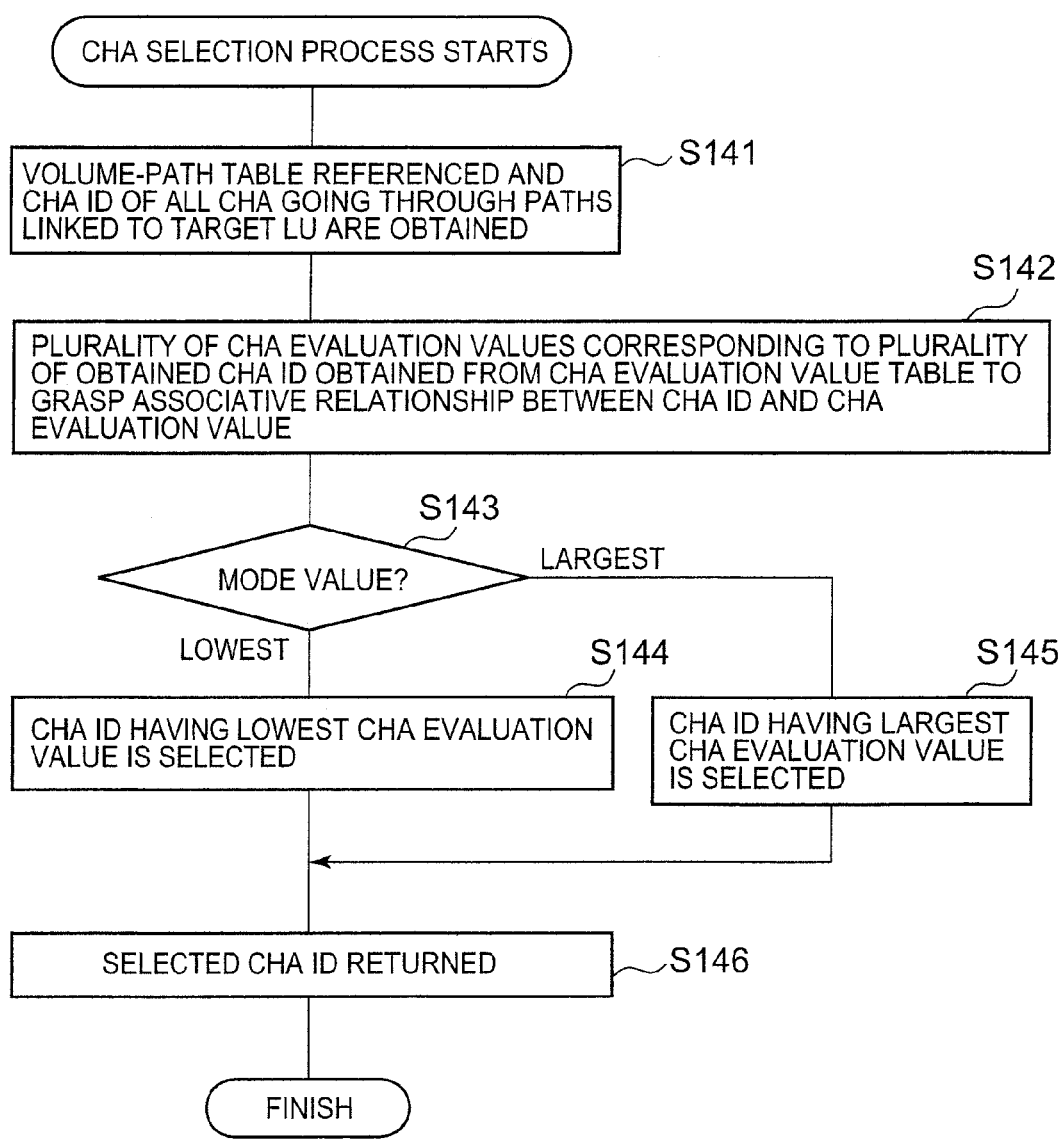
FIG. 23 shows one example of a CHA selection process flow.

At S123, the integrated substitution path management program 67 carries out a seventh call out for executing the CHA selection process shown in FIG. 23. With the seventh call out, the LU ID of the target LU and the mode value: lowest (a value meaning that the CHA having the lowest CHA evaluation value should be selected) are inputted. In this CHA selection process, the CHA ID having the lowest CHA evaluation value is selected from the CHA IDs of the plurality of CHA via paths to the target LU, and the selected CHA ID is registered in the number of paths for updating table 3017 as the ID of the target CHA.

At S124, the integrated substitution path management program 67 specifies from the volume-path table 3009 one or more offline paths that go via the target CHA, and a single offline path is selected from the specified one or more offline paths and the selected offline path is updated to an online path.

At S125, the integrated substitution path management program 67 subtracts one from the value of the update path number corresponding to the target LU.

Figure 28:
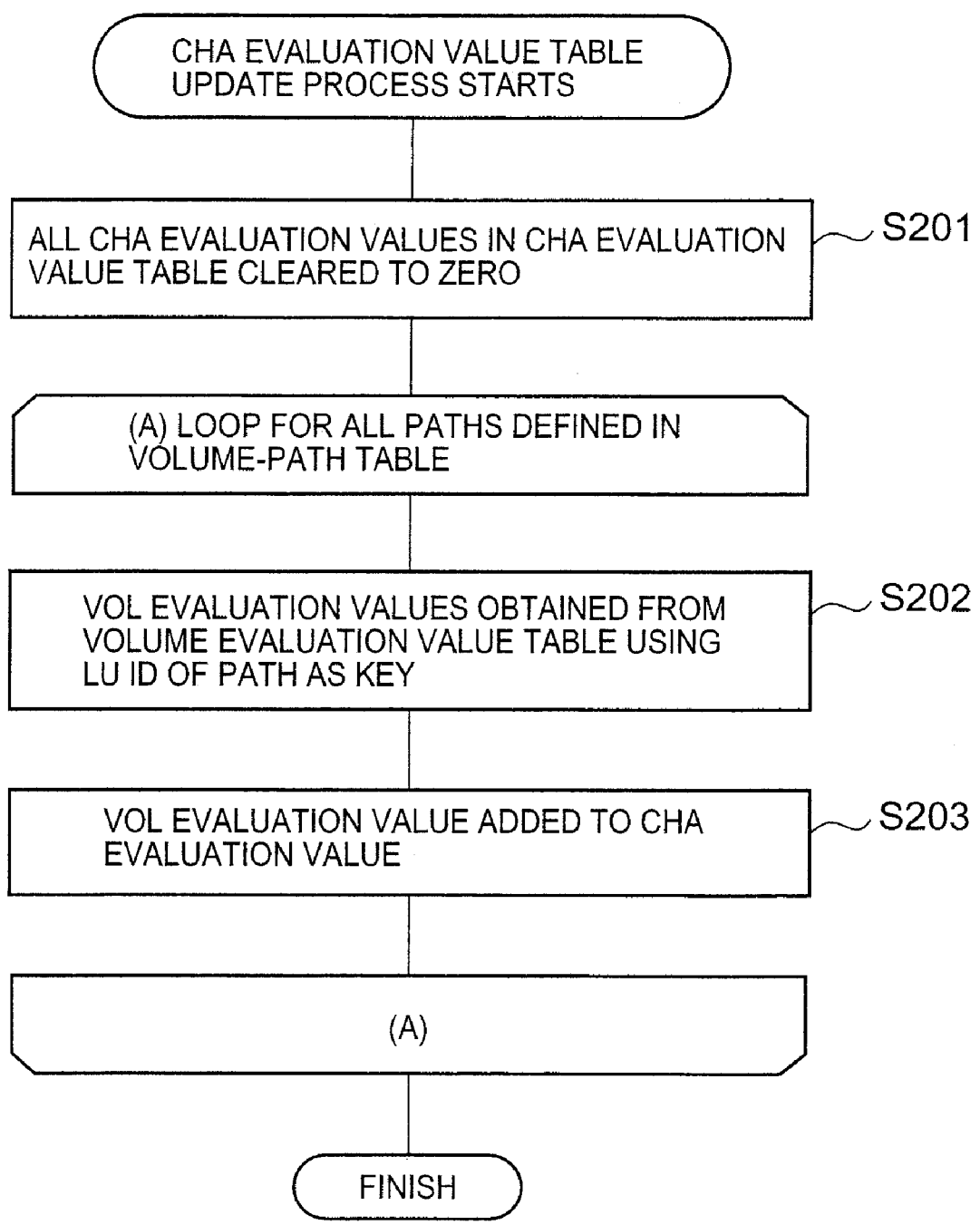
FIG. 28 shows one example of a CHA evaluation value table update process flow.

At S126, the integrated substitution path management program 67 carries out an eighth call out for executing the CHA evaluation value table update process shown in FIG. 28.

If there are as yet no offline paths linked to the target LU and the value of the update path number after updating at S125 is not zero, then the procedure proceeds to S123, but if this is not the case, the procedure proceeds to S137.

At S133, the integrated substitution path management program 67 carries out a seventh call out for executing the CHA selection process shown in FIG. 23. With the seventh call out, the LU ID of the target LU and the mode value: highest (a value meaning that the CHA having the highest CHA evaluation value should be selected) are inputted. In this CHA selection process, the CHA ID having the highest CHA evaluation value is selected from the CHA IDs of the plurality of CHA via paths to the target LU, and the selected CHA ID is registered in the number of paths for updating table 3017 as the ID of the target CHA.

At S134, the integrated substitution path management program 67 specifies from the volume-path table 3009 one or more online paths that go via the target CHA, and a single online path is selected from the specified one or more online paths and the selected online path is updated to an offline path.

At S135, the integrated substitution path management program 67 adds one to the value of the update path number corresponding to the target LU.

At S136, the integrated substitution path management program 67 carries out an eighth call out for executing the CHA evaluation value table update process shown in FIG. 28.

If the online paths linked to the target LU still exceeds the lowest number of paths (the lowest number of paths recorded in the number of paths limit table 3025) and the value of the update path number after updating at S135 is not zero, then the procedure proceeds to S133, but if this is not the case, the procedure proceeds to S137.

At S137, the integrated substitution path management program 67 deletes the update path number corresponding to the target LU from the number of paths for updating table 3017.

If there are update path numbers corresponding to a different target LU, then the procedure from S121 onward is carried out for the different target LU, but if this is not the case, the procedure finishes.

FIG. 23 shows one example of a CHA selection process flow.

This is carried out upon the seventh call out.

At S141, the integrated substitution path management program 67 references the volume-path table 3009 and obtains a plurality of CHA ID corresponding to the target LU.

At S142, the integrated substitution path management program 67 obtains from the CHA evaluation value table 3023 the plurality of CHA evaluation values corresponding to the plurality of CHA ID obtained at S141. Thus it can be known which CHA has which CHA evaluation value.

At S143, the integrated substitution path management program 67 determines whether or not the mode value inputted due to the seventh call out is the lowest. If this is the lowest, the procedure proceeds to S144, if it is the largest, the procedure proceeds to S145.

At S144, the integrated substitution path management program 67 selects from the plurality of CHA ID obtained at S141 the CHA ID having the lowest CHA evaluation value.

At S145, the integrated substitution path management program 67 selects from the plurality of CHA ID obtained at S141 the CHA ID having the largest CHA evaluation value.

At S146, the integrated substitution path management program 67 returns the CHA ID selected at S144 or S145 to the call out source of the seventh call out.

FIG. 24 shows one example of a VOL evaluation value update process flow.

This is executed upon the second call out. At the second call out, the LU ID of the target LU is inputted. The VOL evaluation value (TOTAL) is set to zero as an initial value and the level name corresponding to the LU ID is obtained (S151) from the volume table 3013.

The integrated substitution path management program 67 executes S152 and S153 for each attribute table (see FIG. 8A to 8C).

At S152, the integrated substitution path management program 67 obtains from the level definition table 3005 the VOL evaluation value (for example "RAID 0+1") corresponding to the VOL attribute type (for example, for the attribute table 3011A of FIG. 8A, this is the RAID level) of the attribute table to be referenced, which is a VOL evaluation value corresponding to the level name obtained at S151.

At S153, the integrated substitution path management program 67 obtains from the attribute table the attribute evaluation value corresponding to the obtained VOL evaluation value and adds the obtained attribute evaluation value to the TOTAL.

At S154, the integrated substitution path management program 67 returns the TOTAL as the VOL evaluation value to the call out source of the second call out.

Figure 27:
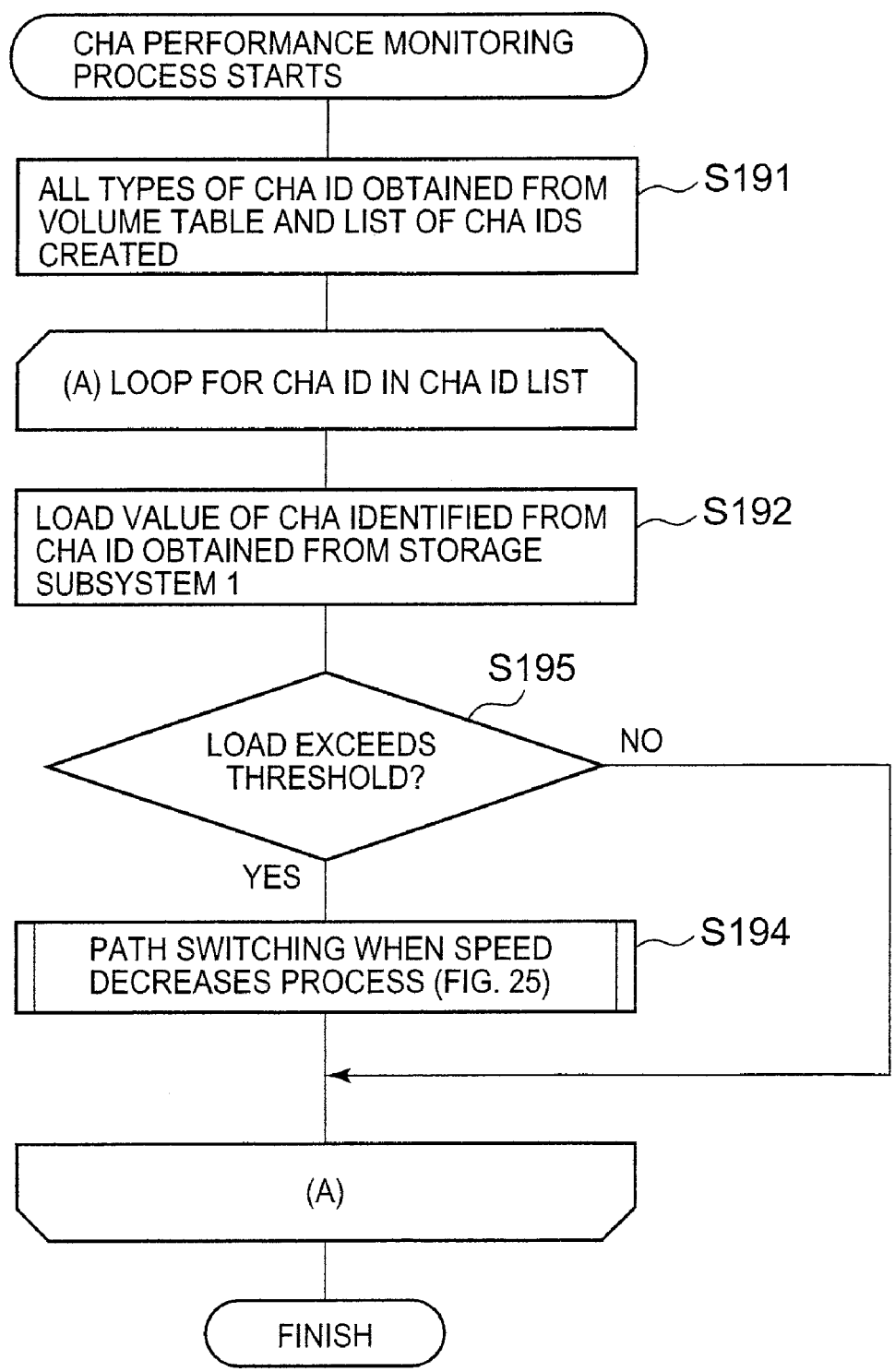
FIG. 27 shows one example of a CHA performance monitoring process flow.

FIG. 27 shows one example of a CHA performance monitoring process flow.

This process is regularly (or irregularly) executed by the performance monitor program 71.

At S191, the performance monitor program 71 obtains all the types of CHA ID recorded in the volume table 3013 and creates a list of CHA ID. S192 to S194 are carried out for each CHA ID in the list of CHA ID.

At S192, the performance monitor program 71 sends a load send request specified by the CHA ID to the storage subsystem 1 such that a value of the load of the CHA identified from that CHA ID is obtained from the storage subsystem 1. The storage subsystem 1 regularly obtains the load for each CHA and records a value indicating the obtained load in the shared memory 25. When the storage subsystem 1 receives the load send request, the load value corresponding to the CHA ID specified by the load send request is sent to the performance monitor program 71.

At S193, the performance monitor program 71 determines whether or not the value of the obtained load is above a predetermined threshold. The threshold is set in advance in the performance monitor program 71 for example. If the value of the obtained load is above the predetermined threshold, the procedure proceeds to S194, but if it is not, then the procedure returns to S192 or finishes.

At S194, the performance monitor program 71 carries out a ninth call out for executing the path switching process at a time of speed reduction. At the ninth call out, the CHA ID is inputted of the CHA whose obtained load value has gone above the predetermined threshold.

The above is one example of a CHA performance monitoring process flow. It should be noted that various values can be used as the CHA load value, including for example the usage rate of the processor mounted in the CHA and the number of access requests received by the CHA per unit of time. Furthermore, instead of or in addition to the CHA load value, the load value of a physical element (such as the host or switch 75 for example) in which a path passes from the host to the LU is monitored, and the performance monitor program 71 may obtain the load value of that element and carry out a comparison between this load value and a threshold.

Figure 25:
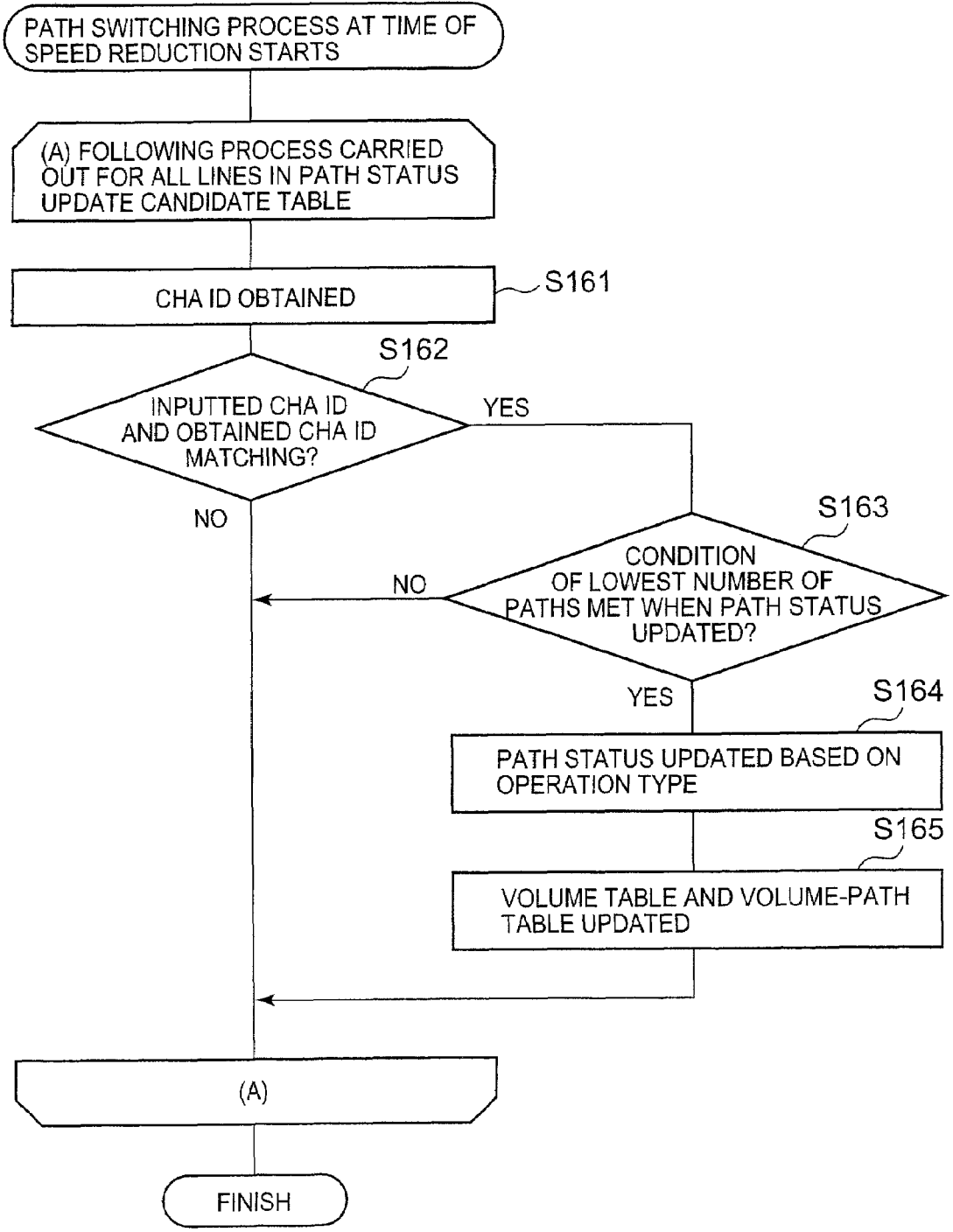
FIG. 25 shows one example of a path switching process flow at a time of a speed reduction.

FIG. 25 shows one example of a path switching process flow at a time of a speed reduction.

This process is executed upon the ninth call out. At the ninth call out, the integrated substitution path management program 67 is started up and the CHA ID is inputted. S161 to S165 are carried out for all the CHA ID recorded in the path status update candidate table 3019.

At S161, the integrated substitution path management program 67 obtains the CHA ID from the path status update candidate table 3019.

At S162, the integrated substitution path management program 67 compares the obtained CHA ID and the CHA ID that was inputted by the ninth call out. If these match then the procedure proceeds to S163, but if they do not match the procedure returns to S161 or finishes.

At S163, the integrated substitution path management program 67 determines whether or not the number of online paths is not less than the lowest number of paths (see FIG. 15) even when the path status of the path status update candidate paths through which the CHA ID passes (the paths corresponding to the path ID in the path status update candidate table 3019) is updated. This determination can be carried out based on the CHA ID and the volume-path table 3009. When a determination is made that the number of online paths is more than the lowest number of paths, the procedure proceeds to S164, but if not, the procedure returns to S161 or finishes.

At S164, the integrated substitution path management program 67 updates the path status of path status update candidate paths through which the CHA ID passes to a path status in which an operation type is indicated corresponding to the path status update candidate path.

At S165 the integrated substitution path management program 67 updates the volume table 3013 and the volume-path table 3009. Specifically, values of the number of online paths are updated corresponding to the LU ID corresponding to the path status update candidate path in the volume table 3013. Furthermore, the path status corresponding to the path ID corresponding to path status update candidate paths is updated in the volume-path table 3009.

FIG. 26 shows one example of a path status update candidate registration process flow.

This process is not for updating the number of paths immediately after migration of the LD, but rather for carrying out registration to the path status update candidate table 3019 for updating later. This process is executed upon the fifth call out. At the fifth call out, the LU ID of the target LU is inputted. The integrated substitution path management program 67 references the number of paths for updating table 3017 and if there is an update path number for the inputted LU ID, executes the procedure from S171 onward.

At S171, the integrated substitution path management program 67 references the update path number corresponding to the target LU. If the value of the update path number is a positive value (YES at S172), this means that the paths are to be increased and therefore the processes of S173 to S177 are carried out. On the other hand, if the value of the update path number is a negative value (NO at S172), this means that the paths are to be decreased and therefore the processes of S183 to S187 are carried out.

At S173, the integrated substitution path management program 67 carries out a seventh call out for executing the CHA selection process shown in FIG. 23. With the seventh call out, the LU ID of the target LU and the mode value: lowest (a value meaning that the CHA having the lowest CHA evaluation value should be selected) are inputted. In this CHA selection process, the CHA ID having the lowest CHA evaluation value is selected from the CHA IDs of the plurality of CHA via paths to the target LU, and the selected CHA ID is registered in the number of paths for updating table 3017 as the ID of the target CHA.

At S174, the integrated substitution path management program 67 determines whether or not all the paths that go through the target CHA are already registered in the path status update candidate table. Here for example one or more paths corresponding to the CHA ID of the target CHA are specified from the volume-path table 3009 and a determination is made as to whether or not all of the specified one or more paths are online. If they are not already registered, then the procedure proceeds to S175, but if they are already registered, the procedure proceeds to S188.

At S175, the integrated substitution path management program 67 specifies from the volume-path table 3009 one or more offline paths that go via the target CHA, and a single offline path is selected from the specified one or more offline paths and information relating to the selected offline path is registered in the path status update candidate table 3019. At this point, the operational type is set to "online."

At S176, the integrated substitution path management program 67 subtracts one from the value of the update path number corresponding to the target LU.

At S177, the integrated substitution path management program 67 carries out an eighth call out for executing the CHA evaluation value table update process shown in FIG. 28.

If there are as yet no offline paths linked to the target LU and the value of the update path number after updating at S176 is not zero, then the procedure proceeds to S173, but if this is not the case, the procedure proceeds to S188.

At S183, the integrated substitution path management program 67 carries out a seventh call out for executing the CHA selection process shown in FIG. 23. With the seventh call out, the LU ID of the target LU and the mode value: highest (a value meaning that the CHA having the highest CHA evaluation value should be selected) are inputted. In this CHA selection process, the CHA ID having the highest CHA evaluation value is selected from the CHA IDs of the plurality of CHA via paths to the target LU, and the selected CHA ID is registered in the number of paths for updating table 3017 as the ID of the target CHA.

At S184, the integrated substitution path management program 67 determines whether or not all the paths that go through the target CHA are already registered in the path status update candidate table. Here for example one or more paths corresponding to the CHA ID of the target CHA are specified from the volume-path table 3009 and a determination is made as to whether or not all of the specified one or more paths are offline. If they are not already registered, then the procedure proceeds to S185, but if they are already registered, the procedure proceeds to S188.

At S185, the integrated substitution path management program 67 specifies from the volume-path table 3009 one or more online paths that go via the target CHA, and a single online path is selected from the specified one or more online paths and information relating to the selected online path is registered in the path status update candidate table 3019. At this point, the operational type is set to "offline."

At S186, the integrated substitution path management program 67 subtracts one from the value of the update path number corresponding to the target LU.

At S187, the integrated substitution path management program 67 carries out an eighth call out for executing the CHA evaluation value table update process shown in FIG. 28.

If the online paths linked to the target LU still exceeds the lowest number of paths (the lowest number of paths recorded in the number of paths limit table 3025) and the value of the update path number after updating at S186 is not zero, then the procedure proceeds to S183, but if this is not the case, the procedure proceeds to S188.

At S188, the integrated substitution path management program 67 deletes the update path number corresponding to the target LU from the number of paths for updating table 3017.

If there are update path numbers corresponding to a different target LU, then the procedure from S171 onward is carried out for the different target LU, but if this is not the case, the procedure finishes.

FIG. 28 shows one example of a CHA evaluation value table update process flow.

This process is executed upon the eighth call out.

At S201, the integrated substitution path management program 67 clears all the CHA evaluation values registered in the CHA evaluation value table 3023 to zero. Then, S202 and S203 are carried out for each path registered in the volume-path table 3009.

At S202, the integrated substitution path management program 67 obtains the VOL evaluation value from the volume evaluation value table 3015 using the LU ID corresponding to the path as a key.

At S203, the integrated substitution path management program 67 adds the obtained VOL evaluation value to the CHA evaluation value corresponding to the CHA ID that corresponds to that path.

The foregoing was description concerning the present embodiment. The following involves summarizing or supplementing the foregoing description of the embodiment. Next, description is given of (a) a multi-path configuration and (b) level definition.

(a) Description of a Multi-Path Configuration

The management server 16 has the following information (i) to (iii).

(i) HBA information of each host. For example, it has information that the host 1 has an HBA 1 and an HBA 2.

(ii) CHA information of the storage subsystem 1. For example, it has information that the storage subsystem 1 has CHA 1 to CHA 6.

(iii) the logical device management table 3001 shown in FIG. 3.

Using these sets of information, the server 16 can configure a multi-path (a plurality of paths) as follows. The following is a description of an outline of one example of this procedure.

(T1) Defining logical units. The administrator creates an LU of a necessary capacity for the business AP 11 of each host. As shown in FIG. 4, the administrator defines the host ID and the LU ID, then the logical device management table 3001 is referenced as shown in FIG. 3 to register the ID of the LD to be mapped in the logical unit management table 3003 shown in FIG. 4. In this case, a single LD may be registered for a single LU, but if the capacity of the LD is not sufficient for the capacity required by the LU, a plurality of LD may be registered for that LU.

(T2) Creation of volume-path table of FIG. 7. The HBA ID, CHA ID, and LU ID are registered for each host. For example, when the LU 1 is created for the host 1, combinations (logical paths) are registered between the LU 1 and all the HBA (HBA 1, HBA 2) of the host 1 and all the CHA (CHA 1 to CHA 7) of the storage subsystem 1. These are simple combinations and therefore can be set automatically. The following illustrates and example of this.

HBA 1-CHA 1-LU 1
HBA 1-CHA 2-LU 1
. . .
HBA 1-CHA 7-LU 1
HBA 2-CHA 1-LU 1
HBA 2-CHA 2-LU 1
. . .
HBA 2-CHA 7-LU 1

It should be noted that when zoning is implemented for security, for example when the host 1 can access only the CHA 1 to CHA 3 and the host 2 can access only the CHA 4 to CHA 7, the combinations are registered within this range.

(T3) The administrator sets the path status to online for the required paths (logical paths) from these combinations.

(T4) Path information (HBA, CHA, and LU combinations and path status) is sent from the management server 16 to the hosts 1 and 2.

(T5) Based on the path information that has been sent, the path management table 57 shown in FIG. 16 is created at the hosts 1 and 2.

(T6) The device link manager 55 of each of the hosts 1 and 2 creates an HLU for each LU.

(T7) Upon receiving an access request to the HLU from the business AP 11, the device link manager 55 selects a single path from the plurality of online paths linked to the LU corresponding to that HLU and uses the path to send the access request to the storage subsystem 1. If multiple access requests are received, then a path may be selected for each access request or a path may be selected for each of a predetermined unit of access requests and the access requests sent to the storage subsystem 1.

Paths are set in each host as in the foregoing manner and access requests to the storage subsystem 1 are carried out using these paths.

It should be noted that in the above-described example, paths are defined by combinations of the HBA, the CHA, and the LU, but port identifiers may be used on the storage subsystem side. That is, instead of an HBA-CHA-LU combination, paths may be defined by a combination of port-LU of the HBA-storage subsystem 1.

Furthermore, in the above-described example, a case was shown in which all the paths for the LU used by the host were set, but it is also possible for the administrator to set the required paths (for example, when the host 1 is to use the LU 1, paths using combinations of the HBA 1, HBA 2, CHA 1, and CHA 2 may be set). In this case, S123 and S124 of FIG. 22 may be arranged as follows. That is, a determination is made as to whether or not there are paths passing through the target CHA, and if paths are present, these are updated to "online," and if paths are not present, paths passing through the target CHA are newly registered in the volume-path table shown in FIG. 7 and their path status set to "online."

(b) Description of Level Defining

For example, the value (importance) of data may change over time. For example, data in a medical organization may have a high probability of being referenced while a patient is visiting a hospital, but when the visit is finished the frequency of referencing declines. However, since the patient may again visit the hospital, it is necessary to save this data, and when the next visit begins, it is likely that the frequency of referencing will increase.

On the one hand, there are various types of storage subsystems, for example, storage subsystems that have fast response speeds are high priced and it may be difficult to install many of these. On the other hand, storage subsystems that have slow response speeds are lower in price and since more of them can be installed, they can be expected to offer increased capacity.

By combining multiple types of storage subsystems in this manner, it is possible to implement management according to the value of the data.

However, managing the several thousand LD in a single storage subsystem would make the burden on the administrator very great. Accordingly, by managing the LD in groups such as a high performance LD group and a mid performance LD group, it is possible to reduce the burden on the administrator.

Level control achieves this and allows management of LD meeting a predetermined condition as a group.

Next, description is given concerning defining levels and carrying out migration of data based on level definitions.

FIG. 18 is a screen that enables the administrator to define levels and specify data migration.

"Migration source LU" refers to an interface for specifying the LU of the migration source. When specifying the migration source LU, a list of LU identifiers registered in the volume-path table of FIG. 7 is displayed in a pull down menu. LU in which paths are defined can be specified as the migration source LU to be used by the business AP 11. By selecting the displayed LU ID, the administrator can specify the migration source LU.

"Migration source LD" refers to an interface for specifying the LD of the migration source. A list of identifiers of the specified LD from the LU registered in the volume-path table 3009 of FIG. 7 is displayed as a pull down menu using the logical unit management table 3003 of FIG. 4. By selecting the displayed LD ID, the administrator can specify the migration source LD.

"Migration source group" refers to an interface for specifying the volume group of the migration source. When the migration source group is specified, a list of group names specified by the administrator is displayed as a pull down menu and the administrator can specify the LU or the LD of the migration source by specifying the group name. For example, when a plurality of LU and LD are being used by the business AP 11, it is difficult for the administrator to select LU and LD one by one. For this reason, by having the user arbitrarily set a name and register the LU and LD associated with this name, it is possible to specify the LU and LD targeted by the name specification. FIG. 6 shows one example of a volume group management table 3007.

"Migration time" refers to an interface for setting the timing by which the data of the LU or LD selected as the migration source is migrated. There are multiple types of timings, for example, any of "execute immediately" (execute after completion of screen input), "execute at time of low load" (execute when the load on the controller is low), and "specify execution" (the administrator inputs a date and time for migration) can be selected.

"Level name" refers to an interface for inputting the level name. When defining a new level, a name is inputted into a blank field. When using a level that is already set, the names of levels that are already set are displayed in a pull down menu by specifying the level name. FIG. 5 shows levels that have already been set and the names "high level," "mid level," and "low level" are displayed in the pull down menu.

"Attribute" refers to an interface for inputting attributes, and when defining a new attribute, these are displayed in a pull down menu by specifying the RAID level, the storage subsystem type, and the storage device type. The contents displayed in the pull down menu are the contents registered in the logical device management table 3001 of FIG. 3. For example, the RAID levels become RAID 0+1, RAID 5, and RAID 1.

It should be noted that when the level name is selected from level names that are already set, the attributes set in FIG. 5 are displayed. If it is desired to change an attribute, a pull down menu is displayed and selection performed by specifying the attribute desired to be changed.

"Path limit" refers to an interface for inputting the path limit. When defining a new level, the lowest necessary number of access paths is specified. If a level that is already defined is selected as the level name, the defined level is displayed. It should be noted that the path limit is the lowest number of paths necessary for the level and is thus different in meaning from the above-described "lowest path number" (the value registered in the path number limit table of FIG. 15), which is not dependent on the level. Incidentally, when decreasing the number of paths, a comparison with the lowest number of paths is carried out, but in this case, if the path limit of levels belonging to LD mapped to the target LU in the processes of FIGS. 22 and 26 for example is greater than the lowest number of paths, the comparison may be made against the path limit instead of the lowest number of paths and conversely, when the path limit is smaller than the lowest number of paths, comparison can be made against the lowest number of paths.

In this manner, the level definition, changing of the level definition, and migration of data to predetermined levels can be specified on the screen shown in FIG. 18.

FIG. 5 shows a level definition table. This is set using the input screen shown in FIG. 18. As noted in the description of FIG. 5, this indicates the conditions for selecting the LD.

FIG. 29 illustrates a process executed by the data level management program 69. Next, description is given by dividing into various cases to facilitate understanding.

Case 1: Administrator Performs Level Definition Only

When the data level management program 69 is activated, the screen shown in FIG. 18 is displayed. When performing level definition only, the administrator inputs the level name and specifies an attribute desired to be specified as a condition. This attribute is selected from the logical device management table 3001 shown in FIG. 3. Specifically, when the administrator specifies the RAID level as the condition, the logical device management table 3001 of FIG. 3 is searched. As a result, since RAID 0+1, RAID 5, and RAID 1 are present in the logical device management table 3001, these are displayed in the pull down menu. The same is true for the other attributes. Next, the administrator inputs the path limit. After the administrator selects or inputs the level name, the attribute, and the path limit, completion is indicated. In this way, the data level management program 69 determines that a level name has been inputted and registers the inputted level name and the specified attribute and path limit in the level definition table. It should be noted that since only level definition is performed here, it is presupposed that the migration source LU, LD, and group are not specified. Accordingly, the process finishes without specifying a migration source.

Case 2: Administrator Specifies Level Definition and Migration Source

The administrator inputs or selects the level name, the attribute, and the path limit, and moreover specifies any of the migration source LU, LD, and the group.

When the administrator specifies completion, the data level management program 69 determines that a level name has been inputted and registers the inputted level name and the specified attribute and path limit in the level definition table.

Next, since the migration source is specified, the LD of the migration source is specified. Specifying the migration source LD is as follows.

Namely, when the LU has been specified as the migration source, the management server 16 specifies an LD from the logical unit management table 3003 of FIG. 4.

When the LD is specified as the migration source, there is no particular process.

When a group has been specified as the migration source, the LD is specified from the volume group management table 3007 of FIG. 6 and the logical unit management table 3003 of FIG. 4.

Next, an LD matching the attribute is searched in the logical device management table 3001. This matches the defined attribute (matches the RAID level or storage subsystem type and meets a condition such as response speed for example) and an LD of a capacity greater than the migration source LD (an LD whose assignment status is "unassigned") is searched for in the logical device management table 3001 and a single LD is specified.

It should be noted that when the capacity cannot be met by a single LD, a test may be carried out of combinations of multiple LD. In this case, a single LD is specified that matches the defined attribute and has a capacity close to that of the migration source LD and the capacity (unassigned capacity) that cannot be met by the specified LD is requested. Next, a single LD is specified that matches the defined attribute and is close to the unassigned capacity. The specified LD requests further unassigned capacity. Here, if the unassigned capacity becomes zero or less, a determination is made that a matching migration source LD is present. If the unassigned capacity is greater than zero, once again a single LD is specified that matches the defined attribute and is close to the unassigned capacity. It should be noted that if there is no LD that matches the defined attribute when there is unassigned capacity, a determination is made that there is no migration destination LD.

In this way, if there is a matching LD, a determination is made that there is a migration destination LD, and the assignment status of that LD in the logical device management table 3001 is registered as "assigned."

Next, when a determination is made that it is migration time based on an unshown clock in the management server 16 and it becomes time for migration, a data migration command in which the migration source LD and the migration destination LD are specified is sent to the storage subsystem 1.

When notification is received of completion of the data migration, the LD ID in the logical unit management table 3003 of FIG. 4 is updated to the LD ID of the migration destination LD, and the host ID, LU ID, number of paths, number of online paths, and type of level are set in the volume table 3013 of FIG. 9 to execute the path switching process shown in FIG. 2.

In case 2 above, an LD having the same attribute as the migration source LD is automatically selected as the migration destination LD.

Case 3: Administrator Selects Already Defined Level and Data is Migrated.

Unlike case 2, in case 3 an LD having a different attribute from the migration source LD can be selected as the migration destination LD. The administrator selects the level. An LD having a VOL attribute value of the thus selected level is selected as the migration destination LD. This is described in detail below.

The administrator specifies the migration source and then selects the level name. By selecting the level name, a list of level names registered in the level definition table 3005 of FIG. 5 is displayed in a pull down menu. By having the administrator select the desired level name from these level names, the corresponding attributes are displayed on the screen.

The level is selected in this case when the administrator indicates completion, and therefore "NO" is given at S213 for "level name inputted?" In this case, a search is made at S217 for an LD having the VOL evaluation value of the level of the selected level name and if this is found, "YES" is given at S218.

FIG. 30 shows a process of the storage subsystem 1 upon accepting the data migration command from the management server 16. The storage subsystem 1 specifies the migration source LD and the migration destination LD and copies data between these. When the data copying is completed, the LD and LU of the copy destination are associated. When this is finished, the data at the migration source LD is deleted and along with information of the LU and the migration destination LD, notification is given to the management server that the data migration has been completed. It should be noted that associating the LU and the copy destination LD involves associating the LU that was associated with the migration source LD (copy source LD) with the migration destination LD (copy destination LD).

The foregoing was description concerning defining levels.

The number of paths is updated at an opportunity for migration, that is, an opportunity of load updating, but this process has already been described in detail, and therefore further description is omitted here.

According to the above-described embodiment, when an attribute of an LU has been updated (that is, when an attribute of the LD mapped to the LU has been updated), the number of paths is updated in response to the attribute. In this way, it is possible that when the degree of importance of data stored in an LU changes from high to low for example, the number of paths is decreased and conversely, when the degree of importance of the data changes from low to high, the number of paths is increased.

The foregoing described embodiments of the present invention but these were examples for the purpose of description and the scope of the present invention is not limited to these embodiments. The present invention can be achieved in various other forms.

For example, the calculation of the VOL evaluation value is not limited to the migration time of the LD but may be carried out periodically.

Furthermore, for example, instead of a method for determining the number of paths based on the VOL evaluation value, the number of paths may be determined based the level to which the LD belongs for example. For example, the number of paths may be decreased when the LD mapped to an LU changes from a certain level to a lower level and the number of paths may be increased when a change is made from a certain level to a higher level. Furthermore, the number of paths to be increased/decreased may be determined according to the extent of the change in level.

What is claimed is:

1. A control device of a computer system in which a plurality of host computers are capable of sharing a same host interface of a storage system,
   wherein the storage system comprises:
   a plurality of host interfaces capable of being shared by the plurality of host computers,
   a plurality of virtual logical volumes (VVOLs) respectively provided to the plurality of host computers, and
   a plurality of actual logical volumes (VOLs) mapped to any of the plurality of VVOLs,
   wherein a plurality of logical paths that pass through any of the plurality of host interfaces span between the plurality of host computers and the plurality of VVOLs, and the host computers access, via paths spanning to themselves, the VVOLs connected to these paths, thereby achieving access to a VOL mapped to a VVOL
   and wherein the control device comprises:
   a VOL status monitoring portion that monitors a VOL status of each VOL mapped to the VVOLs and determines whether or not the VOL status of each VOL mapped to the VVOLs is changed; and
   a path number control portion that updates a number of paths connecting to a target VVOL, which is a VVOL in which a VOL status has changed,
   wherein the VOL status monitoring portion calculates a VOL evaluation value for each of the VOL based on a VOL attribute of the VOL,
   wherein the VOL status is the VOL evaluation value,
   wherein the target VVOL is a VVOL whose VOL evaluation value calculated of a VOL being mapped is different from a previously calculated VOL evaluation value,
   wherein the control device further comprises a storage area in which attribute management information is stored,
   wherein the attribute management information is information representing attribute evaluation values that have been set respectively for a plurality of VOL evaluation values corresponding to a plurality of types of VOL attributes, and
   wherein the VOL status monitoring portion specifies attribute evaluation values corresponding to VOL evaluation values of various VOL attributes of the VOL for each VOL and calculates VOL evaluation values of the VOL based on the specified plurality of attribute evaluation values.

2. A control device of a computer system in which a plurality of host computers are capable of sharing a same host interface of a storage system,
   wherein the storage system comprises:
   a plurality of host interfaces capable of being shared by the plurality of host computers,
   a plurality of virtual logical volumes (VVOLs) respectively provided to the plurality of host computers, and
   a plurality of actual logical volumes (VOLs) mapped to any of the plurality of VVOLs,
   wherein a plurality of logical paths that pass through any of the plurality of host interfaces span between the plurality of host computers and the plurality of VVOLs, and the host computers access, via paths spanning to themselves, the VVOLs connected to these paths, thereby achieving access to a VOL mapped to a VVOL
   and wherein the control device comprises:
   a VOL status monitoring portion that monitors a VOL status of each VOL mapped to the VVOLs and determines whether or not the VOL status of each VOL mapped to the VVOLs is changed; and
   a path number control portion that updates a number of paths connecting to a target VVOL, which is a VVOL in which a VOL status has changed,
   wherein the VOL status monitoring portion calculates a VOL evaluation value for each of the VOL based on a VOL attribute of the VOL,
   wherein the VOL status is the VOL evaluation value,
   wherein the target VVOL is a VVOL whose VOL evaluation value calculated of a VOL being mapped is different from a previously calculated VOL evaluation value,
   wherein the path number control portion determines the number of paths after updating of the target VVOL using a predetermined calculation formula, and
   wherein the calculation formula is based on a current number of paths of the target VVOL and a ratio of the calculated VOL evaluation value to the previously calculated VOL evaluation value.

3. The control device according to claim 2,
   wherein the control device comprises a storage area that stores a correspondence between a first value, which is the current number of paths, and a second value, which becomes a base of the number of paths, and
   when the value calculated by the predetermined calculation formula is not an integer, the path number control portion sets the calculated value to an integer using a predetermined method, sets the calculated value as the second value and registers and stores in the storage area the integer set by the predetermined method of the calculated value as the first value and substitutes the second value into the current number of paths in the predetermined calculation formula.

4. A control device of a computer system in which a plurality of host computers are capable of sharing a same host interface of a storage system, wherein the storage system comprises:
a plurality of host interfaces capable of being shared by the plurality of host computers,
a plurality of virtual logical volumes (VVOLs) respectively provided to the plurality of host computers, and
a plurality of actual logical volumes (VOLs) mapped to any of the plurality of VVOLs,
wherein a plurality of logical paths that pass through any of the plurality of host interfaces span between the plurality of host computers and the plurality of VVOLs, and the host computers access, via paths spanning to themselves, the VVOLs connected to these paths, thereby achieving access to a VOL mapped to a VVOL,
and wherein the control device comprises:
a VOL status monitoring portion that monitors a VOL status of each VOL mapped to the VVOLs and determines whether or not the VOL status of each VOL mapped to the VVOLs is changed; and
a path number control portion that updates a number of paths connecting to a target VVOL, which is a VVOL in which a VOL status has changed,
wherein the path number control portion selects a host interface from two or more host interfaces through which paths connected to the target VVOL pass and which are shared by a plurality of host computers, and updates the number of paths connecting to the target VVOL by increasing or decreasing paths that nass through the selected host interface,
wherein the VOL status monitoring portion calculates a VOL evaluation value for each of the VOL based on a VOL attribute of the VOL,
wherein the VOL status is the VOL evaluation value,
wherein the target VVOL is a VVOL whose VOL evaluation value calculated of a VOL being mapped is different from a previously calculated VOL evaluation value, and
wherein for each of the two or more host interfaces, the path number control portion calculates a host interface evaluation value based on one or more VOL evaluation value of one or more VVOL linked via each host interface and selects a host interface based on the two or more host interface evaluation values corresponding to the two or more host interfaces.

5. The control device according to claim 4,
the path number control portion selects a host interface capable of equalizing as much as possible the two or more host interface evaluation values.

6. The control device according to claim 5,
wherein when the number of paths is to be increased, the path number control portion selects a host interface having the smallest host interface evaluation value of the two or more host interface evaluation values.

7. The control device according to claim 5,
wherein when the number of paths is to be decreased, the path number control portion selects a host interface having the largest host interface evaluation value of the two or more host interface evaluation values.

8. A control device of a computer system in which a plurality of host computers are capable of sharing a same host interface of a storage system, wherein the storage system comprises:
a plurality of host interfaces capable of being shared by the plurality of host computers,
a plurality of virtual logical volumes (VVOLs) respectively provided to the plurality of host computers, and
a plurality of actual logical volumes (VOLs) mapped to any of the plurality of VVOLs,
wherein a plurality of logical paths that pass through any of the plurality of host interfaces span between the plurality of host computers and the plurality of VVOLs, and the host computers access, via paths spanning to themselves, the VVOLs connected to these paths, thereby achieving access to a VOL mapped to a VVOL,
and wherein the control device comprises:
a VOL status monitoring portion that monitors a VOL status of each VOL mapped to the VVOLs and determines whether or not the VOL status of each VOL mapped to the VVOLs is changed; and
a path number control portion that updates a number of paths connecting to a target VVOL, which is a VVOL in which a VOL status has changed,
wherein the control device further comprises a load monitoring portion that monitors a presence/absence of physical elements relating to paths and determines a presence/absence of load change,
wherein the path number control portion updates the number of paths connecting to the target VVOL with a timing at which load change has been detected,
wherein updating of the number of paths is configured such that, of a predefined plurality of paths, the number of paths whose path status is set to online is updated, and
wherein the path number control portion determines one or more update target path candidates, which are candidates of paths for path status updating, with a timing at which VOL status change has been detected, and then selects of path candidates to undergo path status updating from among the one or more update target path candidates that have been determined, with a timing at which a change in load is determined, and updates the path status.

9. A control device of a computer system in which a plurality of host computers are capable of sharing a same host interface of a storage system, wherein the storage system comprises:
a plurality of host interfaces capable of being shared by the plurality of host computers,
a plurality of virtual logical volumes (VVOLs) respectively provided to the plurality of host computers, and
a plurality of actual logical volumes (VOLs) mapped to any of the plurality of VVOLs,
wherein a plurality of logical paths that nass through any of the plurality of host interfaces span between the plurality of host computers and the plurality of VVOLs, and the host computers access, via paths spanning to themselves, the VVOLs connected to these paths, thereby achieving access to a VOL mapped to a VVOL,
and wherein the control device comprises:
a VOL status monitoring portion that monitors a VOL status of each VOL mapped to the VVOLs and determines whether or not the VOL status of each VOL mapped to the VVOLs is changed; and
a path number control portion that updates a number of paths connecting to a target VVOL, which is a VVOL in which a VOL status has changed,
wherein the VOL status is a hierarchy level to which the VOL belongs, wherein the hierarchy level is defined by a plurality of VOL attribute values respectively corresponding to a plurality of types of VOL attributes, and the VOL hierarchy level is defined by at least two of a RAID level of the VOL, a storage subsystem type having the VOL, and a storage device type having the VOL, wherein the target VVOL is a VVOL in which a VOL hierarchy level mapped to the target VVOL has changed, wherein when detected that the hierarchy level to which the VOL belongs has changed from a first level to a second level which is higher, the path number control portion increases the number of paths connecting to the target VVOL mapped to the VOL to a number higher than before the change, and when detected that the hierarchy level to which to VOL belongs has changed from a second level to a first level which is lower, decreases the number of paths connecting to the target VVOL mapped to the VOL to a number lower than before the change, wherein updating of the number of paths is configured such that, of a predefined plurality of paths, the number of paths whose path status is set to online is updated, wherein the control portion further comprises a load monitoring portion that monitors a presence/absence of physical elements relating to paths and determines a presence/absence of load change, and wherein the path number control portion determines one or more update target path candidates, which are candidates of paths for path status updating, with a timing at which VOL status change has been detected, and selects path candidates to undergo path status updating from among the one or more update target path candidates that have been determined, with a timing at which a change in load is determined, and updates the path status.

* * * * *